US010298939B2

(12) United States Patent
Coban et al.

(10) Patent No.: US 10,298,939 B2
(45) Date of Patent: May 21, 2019

(54) QUANTIZATION IN VIDEO CODING

(75) Inventors: Muhammed Zeyd Coban, Carlsbad, CA (US); Marta Karczewicz, San Diego, CA (US); In Suk Chong, San Diego, CA (US); Xianglin Wang, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1918 days.

(21) Appl. No.: 13/529,508

(22) Filed: Jun. 21, 2012

(65) Prior Publication Data
US 2012/0328004 A1  Dec. 27, 2012

Related U.S. Application Data

(60) Provisional application No. 61/500,103, filed on Jun. 22, 2011, provisional application No. 61/504,182, (Continued)

(51) Int. Cl.
H04N 7/40 (2006.01)
H04N 7/32 (2006.01)
H04N 19/196 (2014.01)
H04N 19/105 (2014.01)
H04N 19/176 (2014.01)
H04N 19/61 (2014.01)
(Continued)

(52) U.S. Cl.
CPC ......... *H04N 19/196* (2014.11); *H04N 19/105* (2014.11); *H04N 19/176* (2014.11); *H04N 19/428* (2014.11); *H04N 19/463* (2014.11); *H04N 19/61* (2014.11); *H04N 19/90* (2014.11)

(58) Field of Classification Search
CPC .. H04N 19/105; H04N 19/176; H04N 19/196; H04N 19/463; H04N 19/61; H04N 19/90
See application file for complete search history.

(56) References Cited

U.S. PATENT DOCUMENTS 6,134,269 A * 10/2000 Puri et al. ................ 375/240.03
7,263,125 B2   8/2007 Lainema
(Continued)

FOREIGN PATENT DOCUMENTS

JP    2013005111 A    1/2013
WO   2004054158 A2    6/2004
(Continued)

OTHER PUBLICATIONS

Aoki, et al., "Prediction-based QP derivation", Mar. 10, 2011,No. JCTVC-E215, Mar. 10, 2011, XP030008721,ISSN: 0000-0007, 11 pp.
(Continued)

*Primary Examiner* — Dave Czekaj
*Assistant Examiner* — Nazmul Haque
(74) *Attorney, Agent, or Firm* — Shumaker & Sieffert, P.A.

(57) ABSTRACT

In an example, aspects of this disclosure relate to a method of coding video data that includes identifying a plurality of quantization parameter (QP) values associated with a plurality of reference blocks of video data. The method also includes generating a reference QP for the plurality of reference blocks based on the plurality of QPs. The method also includes storing the reference QP, and coding a block of video data based on the stored reference QP.

53 Claims, 9 Drawing Sheets

Related U.S. Application Data filed on Jul. 2, 2011, provisional application No. 61/540,886, filed on Sep. 29, 2011, provisional application No. 61/552,895, filed on Oct. 28, 2011.

(51) Int. Cl.
   *H04N 19/463* (2014.01)
   *H04N 19/90* (2014.01)
   *H04N 19/426* (2014.01)

(56) References Cited

U.S. PATENT DOCUMENTS

| | | | |
|---|---|---|---|
| 8,542,730 | B2 | 9/2013 | Ye et al. |
| 2005/0232354 | A1* | 10/2005 | Chen .................. 375/240.16 |
| 2006/0133481 | A1* | 6/2006 | Chujoh ................ 375/240.03 |
| 2006/0245496 | A1 | 11/2006 | Chen |
| 2007/0047644 | A1* | 3/2007 | Lee et al. .............. 375/240.1 |
| 2007/0081590 | A1 | 4/2007 | Goh et al. |
| 2007/0177665 | A1 | 8/2007 | Zhou et al. |
| 2008/0025401 | A1* | 1/2008 | Lee et al. ............. 375/240.16 |
| 2008/0304562 | A1* | 12/2008 | Chang et al. ......... 375/240.03 |
| 2009/0021390 | A1 | 1/2009 | Amidi |
| 2010/0195723 | A1 | 8/2010 | Ikai et al. |
| 2011/0150077 | A1 | 6/2011 | Kishore et al. |
| 2011/0194615 | A1 | 8/2011 | Zheludkov et al. |

FOREIGN PATENT DOCUMENTS

| | | |
|---|---|---|
| WO | 2009105732 | 8/2009 |
| WO | WO2011086779 A1 | 7/2011 |
| WO | 2011140211 A2 | 11/2011 |
| WO | 2011156458 A1 | 12/2011 |
| WO | 2012023806 A2 | 2/2012 |

OTHER PUBLICATIONS

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 11-20, 2012, JCTVC-J1003_d7, 261 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 21-30, 2011, JCTVC-G1103_d2, 214 pp.

Coban, et al., "Temporal QP Memory Compression", JCT-VC Meeting; MPEG Meeting; Jul. 14, 2011-Jul. 22, 2011; Torino; (Joint Collaborative Team on Video Coding of ISO/IEC JTC1/SC29/WG11 and ITU-T SG.16 ); URL: http://wftp3.itu.int/av-archjjctvc-site/,, No. JCTVC-F499, XP030009522, 10 pp.

International Search Report and Written Opinion—PCT/US2012/043807—ISA/EPO—dated Sep. 14, 2012, 20 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Wiegand, et al., "Draft ITU-T Recommendation and Final Draft International Standard of Joint Video Specification (ITU-T Rec. H .264 ISO/IEC 14496-10 AVC)", JVT Meeting; MPEG Meeting; Mar. 7, 2003-Mar. 14, 2003; Pattaya,TH; (Joint Video Team of ISO/IEC JTC1/SC29/WG11 and ITU-T 56.16 ), No. JVT-G050r1, [uploaded in parts] (total of 269 pgs.).

Wiegand et al., "WD1: Working Draft 1 of High-Efficiency Video Coding", JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

International Preliminary Report on Patentability from International Application No. PCT/US2012/043807, dated Sep. 4, 2013, 14 pp.

Second Written Opinion from International Application No. PCT/US2012/043807, dated Jun. 5, 2013, 11 pp.

Response to Written Opinion dated Sep. 14, 2012, from International Application No. PCT/US2012/043807, filed Apr. 22, 2013, 34 pp.

Response to Second Written Opinion dated Jun. 5, 2013, from International Application No. PCT/US2012/043807, filed Aug. 2, 2013, 29 pp.

Kobayashi M et al: "Sub-LCU level delta QP signaling", 96. MPEG Meeting; Mar. 21, 2011-Mar. 25, 2011; Geneva; (Motion Picture Expert Group or ISO/IEC JTC1/SC29/WG11), No. m19716, Mar. 17, 2011 (Mar. 17, 2011), XP030048283, paragraph [0001]—paragraph [0002] (9 pages).

Notice of Grounds for Rejection from counterpart Korean Application No. 2014-7001660, dated Apr. 30, 2015, 10 pp.

Coban, et al., "CU-Level QP Prediction", JCT-VC Meeting; MPEG Meeting; Mar. 16-23, 2011; Geneva; (Joint Collaborative Team on Video Coding of ISO/IEC JTC1/SC29/WG11AND ITU-T SG.16); URL: htttp://wftp3.itu.int/av-arch/jctvc-site/,, No. JCTVC-E391, XP030008897, 4 pp.

Final Office Action from counterpart Japanese Application No. 2014-517216, dated Jun. 9, 2015, 6 pp.

Office Action from counterpart European Application No. 12731276.7, dated Jun. 11, 2015, 11 pp.

Response to Official Communication from corresponding Application Serial No. 12 731 276.7 dated Dec. 11, 2015 (15 pages).

Notice of Final Rejection from corresponding Korean Application Serial No. 2014-7001660 dated Dec. 24, 2015 including translation (6 pages)

\* cited by examiner

QUANTIZATION IN VIDEO CODING

This application claims priority to U.S. Provisional Patent Application No. 61/500,103, filed 22 Jun. 2011, U.S. Provisional Patent Application No. 61/504,182, filed 2 Jul. 2011, U.S. Provisional Patent Application No. 61/540,886, filed 29 Sep. 2011, and U.S. Provisional Patent Application No. 61/552,895, filed 28 Oct. 2011, the entire contents of each of which are hereby incorporated by reference in their entirety.

TECHNICAL FIELD

This disclosure relates to video coding techniques, and, more specifically, quantization in video coding.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like.

Digital video devices may implement video compression techniques, such as those described in the standards defined by MPEG-2, MPEG-4, ITU-T H.263, ITU-T H.264/MPEG-4, Part 10, Advanced Video Coding (AVC), and extensions of such standards, to transmit and receive digital video information more efficiently. New video coding standards, such as the High Efficiency Video Coding (HEVC) standard being developed by the "Joint Collaborative Team—Video Coding" (JCT-VC), which is a collaboration between MPEG and ITU-T, are being developed. The emerging HEVC standard is sometimes referred to as H.265, although such a designation has not formally been made.

SUMMARY

The techniques of this disclosure generally relate to video coding and quantization in video coding. For example, the techniques of this disclosure generally relate to reducing an amount of data that is stored for quantization during video coding. That is, quantization may be performed during video coding using a quantization parameter (QP). In some instances, a QP may be predicted from another stored QP, which may be referred to as a reference QP. The techniques of this disclosure generally relate to reducing an amount of data that is stored for predicting QPs. For example, the techniques of this disclosure relate to limiting an amount of reference QP data that is stored. According to aspects of this disclosure, rather than storing reference QPs for each block of each reference picture (e.g., a picture used for predicting other pictures), only a portion of such reference QP data may be stored.

According to other aspects, this disclosure includes techniques for limiting the amount of reference QP data that is stored by predicting a reference QP and storing reference QPs relative to the predicted reference QP. For example, QPs may not exhibit wide variations over a given area. In such examples, a reference QP may be predicted for an area, and only the differences between the predicted reference QP and the actual reference QPs may be stored. By storing difference values, which may be referred to as delta reference QPs, the amount of reference QP data that is stored may be reduced.

According to other aspects, this disclosure includes techniques for predicting a QP for coding a current block using more than one reference QP (e.g., from more than one reference block). That is, the techniques of this disclosure include generating a delta QP for a current block using a predicted QP that is based on more than one reference QP, for example, from more than one reference picture. According to some aspects of this disclosure, a weighted QP prediction value may be generated using the multiple reference QPs.

In an example, aspects of this disclosure relate to a method of coding video data comprising identifying a plurality of quantization parameter (QP) values associated with a plurality of reference blocks of video data; generating a reference QP for the plurality of reference blocks based on the plurality of QPs; storing the reference QP; and coding a block of video data based on the stored reference QP.

In another example, aspects of this disclosure relate to an apparatus for coding video data comprising one or more processors, wherein the one or more processors configured to identify a plurality of quantization parameter (QP) values associated with a plurality of reference blocks of video data; generate a reference QP for the plurality of reference blocks based on the plurality of QPs; store the reference QP; and code a block of video data based on the stored reference QP.

In another example, aspects of this disclosure relate to an apparatus for coding video data comprising means for identifying a plurality of quantization parameter (QP) values associated with a plurality of reference blocks of video data; means for generating a reference QP for the plurality of reference blocks based on the plurality of QPs; means for storing the reference QP; and means for coding a block of video data based on the stored reference QP.

In another example, aspects of this disclosure relate to a non-transitory computer-readable storage medium having instructions stored thereon that, when executed, cause one or more processors to identify a plurality of quantization parameter (QP) values associated with a plurality of reference blocks of video data; generate a reference QP for the plurality of reference blocks based on the plurality of QPs; store the reference QP; and code a block of video data based on the stored reference QP.

In another example, aspects of this disclosure relate to a method of coding video data comprising determining a predicted reference QP for one or more reference blocks of video data; determining an actual QP for each reference block of the one or more reference blocks; generating a delta reference QP for each reference block of the one or more reference blocks based on a difference between the actual QP and the predicted reference QP; and storing the delta reference QPs for each reference block.

In another example, aspects of this disclosure relate to an apparatus for coding video data comprising one or more processors, wherein the one or more processors are configured to determine a predicted reference QP for one or more reference blocks of video data; determine an actual QP for each reference block of the one or more reference blocks; generate a delta reference QP for each reference block of the one or more reference blocks based on a difference between the actual QP and the predicted reference QP; and store the delta reference QPs for each reference block.

In another example, aspects of this disclosure relate to a method of coding video data, the method comprising identifying a first reference QP associated with one or more blocks of video data having a first temporal instance; identifying a second reference QP associated with one or more blocks of video data having a second temporal instance, wherein the second temporal instance is different than the first temporal instance; and generating a QP predictor for a block of video data having a third temporal instance, wherein the third temporal instance is different than the first temporal instance and the second temporal instance, and wherein the QP predictor is based on the first reference QP and the second reference QP.

In another example, aspects of this disclosure relate to an apparatus for coding video data comprising one or more processors, wherein the one or more processors are configured to identify a first reference QP associated with one or more blocks of video data having a first temporal instance; identify a second reference QP associated with one or more blocks of video data having a second temporal instance, wherein the second temporal instance is different than the first temporal instance; and generate a QP predictor for a block of video data having a third temporal instance, wherein the third temporal instance is different than the first temporal instance and the second temporal instance, and wherein the QP predictor is based on the first reference QP and the second reference QP.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
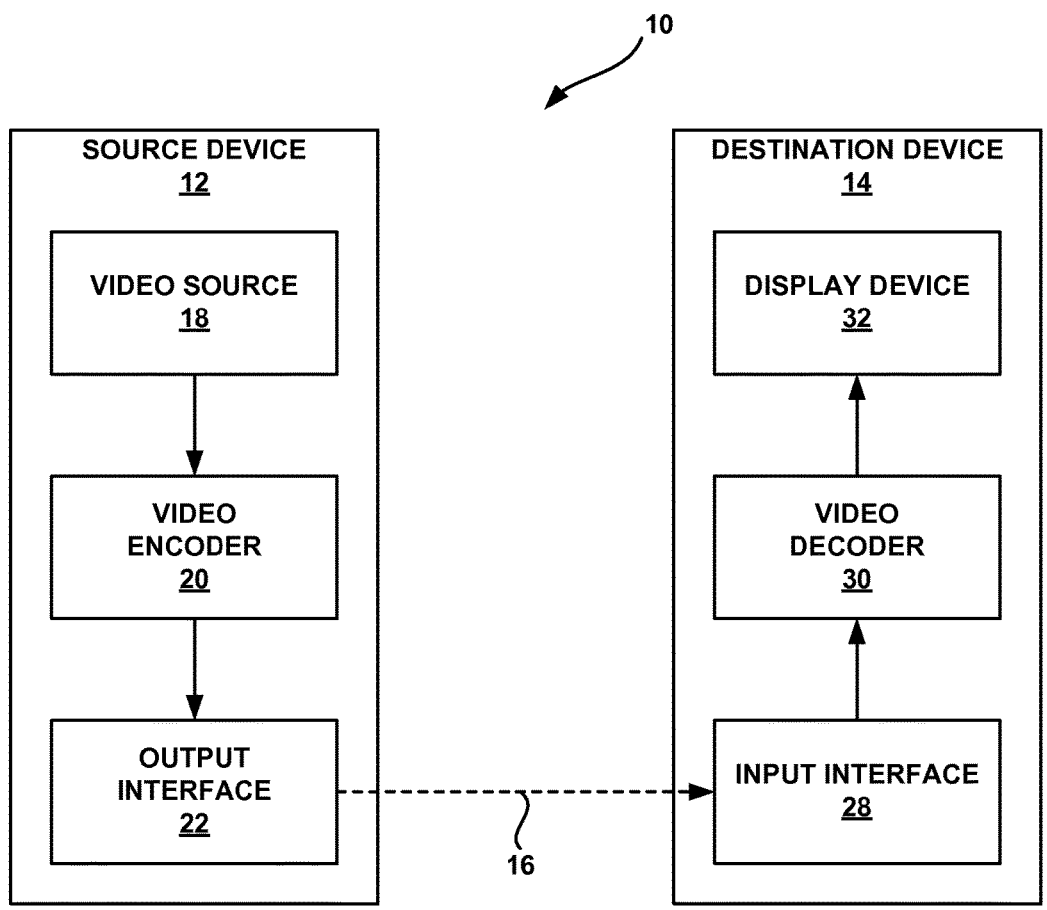
FIG. 1 is a block diagram illustrating an example video encoding and decoding system that may utilize the techniques of this disclosure.

The techniques of this disclosure generally relate to reducing an amount of data that is stored during quantization. More specifically, the techniques of this disclosure relate to reducing the amount of reference quantization parameter (QP) data that is stored when performing QP prediction.

In general, encoded video data may include prediction data and residual data. For example, a video encoder may produce prediction data during an intra-prediction mode or an inter-prediction mode. Intra-prediction generally involves predicting the pixel values in a block of a picture relative to reference samples in neighboring, previously coded blocks of the same picture. Inter-prediction generally involves predicting the pixel values in a block of a picture relative to data of a previously coded picture.

Following intra- or inter-prediction, the video encoder may calculate residual pixel values for the block. The residual values generally correspond to differences between the predicted pixel value data for the block and the true pixel value data of the block. For example, the residual values may include pixel difference values indicating differences between coded pixels and predictive pixels. The coded pixels may be associated with a block of pixels to be coded, and the predictive pixels may be associated with one or more blocks of pixels used to predict the coded block.

To further compress the residual value of a block, the video encoder may transform the residual values into a set of transform coefficients that compact as much data (also referred to as "energy") as possible into as few coefficients as possible. The transform converts the residual values of the pixels from the spatial domain to transform coefficients in a transform domain. The transform coefficients correspond to a two-dimensional matrix of coefficients that is ordinarily the same size as the original block. In other words, there are ordinarily as many transform coefficients as pixels in the original block. However, due to the transform, many of the transform coefficients may have values equal to zero.

The video encoder may then quantize the transform coefficients to further compress the video data. Quantization generally involves mapping values within a relatively large range to values in a relatively small range, thus reducing the amount of data needed to represent the quantized transform coefficients. The video encoder may quantize the transform coefficients by applying a quantization parameter (QP) according to a predefined algorithm. The video encoder may modify the degree of quantization applied to the transform coefficient values by adjusting the QP. In some examples, the video encoder may select a QP in a range of −26 to +25.

In some examples, the video encoder may vary the QP from one block to another within a slice (or a picture). For example, varying the QP between blocks, sometimes referred to as adaptive quantization, targets visual quality improvement. That is, human eyes are generally more sensitive to degradation within visually "flat" areas (e.g., areas of a slice or picture without much luminance or color variation) than degradation within visually "busy" areas. Accordingly, adaptive quantization attempts to exploit these visual limitations by performing finer quantization on flat areas and coarser quantization on busy areas.

To reduce the amount of data that the video encoder must signal in the bitstream, the video encoder may predict a QP for a given block. For example, rather than include the QP itself, the video encoder may identify a change (i.e., a delta) between the actual QP for a current block and some reference QP (e.g., a QP associated with a different block). The video encoder may then signal the delta QP for the current block in the bitstream.

When generating a delta QP, the video encoder may identify a reference QP that is associated with a block that spatially neighbors the current block (e.g., a neighboring block in the same slice or picture). For example, an H.264 compliant encoder may signal a delta QP at macroblock level, using a neighboring macroblock's QP as a reference QP for a current macroblock. The inherently consistent macroblock size and raster scanning order naturally preserves the spatial correlation that exists between the QPs of neighboring macroblocks.

However, as described in greater detail below, the proposed HEVC standard introduces the concept of a coding unit (CU), which may vary in size. The variable size and scanning order of CUs may break the spatial correlation that is prevalent in H.264. In such instances, a reference QP of a different temporal instance than the current QP may provide a more accurate predictor than a spatially neighboring QP. Accordingly, in some examples, a video encoder may identify a reference QP that is associated with a block from a different temporal instance than the current block when generating a delta QP for the current block. That is, the video encoder may identify a QP associated with a previously encoded block of a previously encoded picture as a reference QP for a QP of a current block of a current picture. In examples in which the current block is inter-predicted, the reference QP may be associated with the reference block identified by motion vector information. The video encoder may then generate a delta QP for the current block using the reference QP.

In order to efficiently predict a QP of a current block using a reference QP in a different temporal instance, the video encoder must store a number of QPs. For example, the video encoder must store QPs for each block of each reference picture that may be referenced by a current block. Likewise, a video decoder must also store reference QP data to perform inverse quantization. Significant storage may be required to store such QPs. For example, the proposed HEVC standard allows up to 16 reference pictures to be used, and QPs may be generated and stored for each 8×8 block within each picture. Moreover, QPs may vary between 0-51. If all QPs of reference pictures are stored for use as reference QPs, a significant amount of storage may be consumed.

The techniques of this disclosure generally relate to reducing an amount of data that is stored for predicting QPs. For example, the techniques of this disclosure relate to limiting an amount of reference QP data that is stored. In some examples, only a portion of reference QP data may be stored for a reference picture (or slice). In other examples, a predicted reference QP may be generated, and a difference between the predicted reference QP and the actual reference QPs may be stored.

For example, as noted above, a video coder may determine a delta QP for a block of video data, which indicates a QP used to quantize transform coefficients of the block relative to some other QP. In some instances, to generate the delta QPs using reference QPs associated with reference blocks of other temporal instances, the video coder may store a reference QP for each 8×8 reference block (e.g., block of a reference picture used for prediction). In one example, according to aspects of this disclosure, a video coder may generate an average reference QP for a plurality of reference blocks. That is, the video coder may average reference QPs within a predefined area of a reference picture. In some examples, the video coder may average reference QPs associated with blocks located in a 16×16 area, a 32×32 area, a 64×64 area, or the like. The reference QP averaging areas may generally align with block boundaries such that the averaging area encompasses one or more full blocks (e.g., without dividing a block between two separate averaging areas). The number of QPs that are averaged may be selected according to a minimum block size, a desired amount of storage savings, or the like.

In another example, to reduce an amount of reference QP data that is stored, a video coder may sub-sample reference QPs from a particular area. For example, a video coder may identify an area that includes a number of blocks having a number of associated QPs (e.g., QPs that may be used as reference QPs during coding). Instead of averaging QPs over the area, as described above, the video coder may select one of the reference QPs as a representative reference QP of the area. In some examples, as described above with respect to the averaging example, the video coder may select a 16×16, 32×32, 64×64, or other area that is generally consistent with block boundaries.

According to other aspects of this disclosure, a video coder may limit the amount of reference QP data that is stored by predicting a reference QP and storing reference QP values relative to the predicted reference QP. For example, QPs may not exhibit wide variations over a given area. In such examples, a reference QP may be predicted for an area, and only the differences between the predicted reference QP and the actual reference QPs may be stored. By storing difference values, which may be referred to as delta reference QPs, the amount of reference QP data that is stored may be reduced.

In an example, a video coder may use a slice QP (or delta QP) as a predicted QP for determining delta reference QPs. For example, according to some video coding standards, such as the proposed HEVC standard, a QP (or delta QP) may be identified at the slice level. According to aspects of this disclosure, the video coder may generate a delta reference QP for each block of a slice by calculating the difference between the block's actual QP and the slice QP (predicted QP). The delta reference QP values may then be stored and used to determine delta QPs during coding. In other examples, the video coder may select or generate a different predicted reference QP (e.g., a mean, median, minimum, or maximum QP of blocks within a slice or picture). Additionally, in some examples, the video coder may truncate (e.g., round or clip) the number of bits associated with the delta reference QPs prior to storing the delta reference QPs.

According to other aspects, this disclosure includes techniques for predicting a QP for coding a current block using more than one reference QP (e.g., from more than one reference block). That is, the techniques of this disclosure include generating a delta QP for a current block using a predicted QP that is based on more than one reference QP, for example, from more than one reference picture. According to some aspects of this disclosure, a weighted QP prediction value may be generated using the multiple reference QPs.

Accordingly, certain examples of this disclosure may refer to a QP (or actual QP), a reference QP, a delta QP, and/or a delta reference QP. In general, a QP (or actual QP) refers to a QP for quantizing or inverse quantizing one or more transform coefficients. A delta QP may be based on a difference between an actual QP and some other QP, which may be referred to as a reference QP. For example, a video encoder may determine a delta between an actual QP a reference QP and indicate this delta QP in an encoded bitstream. A video decoder may receive the delta QP in the encoded bitstream and determine the actual QP using the delta QP and the same reference QP used by the video encoder.

In some instances, a video encoder or video decoder may store reference QPs, so that the reference QPs are available for generating a delta QP (at the video encoder, e.g., based on a difference between the actual QP and the reference QP)

or for generating an actual QP (at the video decoder, e.g., based on a combination of the delta QP and the reference QP). In such examples, according to the aspects of this disclosure as described below, a delta reference QP may be generated to reduce the storage requirements for storing reference QP data. Accordingly, in a general a delta reference QP may refer to a difference, i.e., delta, between a reference QP and some other QP.

FIG. 1 is a block diagram illustrating an example video encoding and decoding system 10 that may perform the techniques of this disclosure for performing quantization (including inverse-quantization) of transform coefficients. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

This disclosure may generally refer to video encoder 20 "signaling" certain information to another device, such as video decoder 30. It should be understood, however, that video encoder 20 may signal information by associating certain syntax elements with various encoded portions of video data. That is, video encoder 20 may "signal" data by storing certain syntax elements to headers of various encoded portions of video data. In some cases, such syntax elements may be encoded and stored (e.g., stored to storage medium 34 or file server 36) prior to being received and decoded by video decoder 30. Thus, the term "signaling" may generally refer to the communication of syntax or other data for decoding compressed video data, whether such communication occurs in real- or near-real-time or over a span of time, such as might occur when storing syntax elements to a medium at the time of encoding, which then may be retrieved by a decoding device at any time after being stored to this medium.

The techniques of this disclosure, which generally relate to entropy coding data, are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for coding motion vectors and for performing bi-prediction in HEVC and its extensions, such as multiview or 3DV extensions. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for entropy coding video data may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. In particular, this disclosure refers to a "coded unit" as a unit of data including multiple blocks, such as a slice, picture, set of wavefronts, or tile. Thus, the term "coded unit" should be understood to include multiple blocks, e.g., multiple largest coding units (LCUs). Moreover, the term "coded unit" should not be confused with the terms "coding unit" or CU as used in HEVC. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video picture (or "frame," which may be used interchangeably with "picture") may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A video picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder 20 may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Video encoder 20 may then quantize the transform coefficients to further compress the video data. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Quantization may be applied according to a quantization parameter (QP), which may be indexed to a quantizer step size that is applied to a transform coefficient during quantization. Video encoder 20 may modify the degree of quantization (e.g., the quantizer step size) by adjusting the QP. For example, according to some video coding standards, such as H.264 and the emerging HEVC standard, video encoder 20 may select a QP in a range of 0-51 in whole integer increments (although other ranges are possible, such as −26 to +25, or another range). Video encoder 20 may apply the quantizer step size associated with the selected QP.

To further reduce the amount of data that video encoder 20 signals in the bitstream, video encoder 20 may predict a QP for a given block. For example, rather than include the QP itself, video encoder 20 may identify a change (i.e., a delta) between the actual QP for a current block and some reference QP (e.g., a QP associated with a different block). Video encoder 20 may then signal the delta QP for the current block in the bitstream. In some examples, the reference QP may be associated with a block that spatially neighbors the block currently being encoded. In other examples, the reference QP may be associated with a block in a different temporal instance than the block currently being encoded. In any event, video encoder 20 must store reference QPs for each block that may be referenced by a current block (e.g., for generating a delta QP).

Certain techniques of this disclosure generally relate to reducing an amount of data that is stored for reference QPs. For example, according to aspects of this disclosure, rather than storing reference QPs for each block of each reference picture (e.g., a picture used for predicting other pictures), video encoder 20 may only store a portion of such reference QP data. That is, rather than storing a reference QP for each block of each reference picture (for generating predictive pixel data), video encoder 20 may average QPs, sub-sample QPs, or otherwise reduce the amount of such reference QP data, as described in greater detail below. When generating a delta QP (e.g., to include in an encoded bitstream), video encoder 20 may then determine a delta QP based on a difference between the stored reference QP data and the actual QP.

According to other aspects, this disclosure includes techniques for limiting the amount of reference QP data that is stored by predicting a reference QP and storing reference QPs relative to the predicted reference QP. For example, video encoder 20 may predict a reference QP for an area of a picture, and video encoder 20 may only the differences between the predicted reference QP and actual reference QPs. By storing difference values, which may be referred to as delta reference QPs, video encoder 20 may reduce the amount of reference QP data that is stored. When generating a delta QP (e.g., to include in an encoded bitstream), video encoder 20 may determine a reference QP based on the delta reference QP. That is, video encoder 20 may reconstruct the reference QP based on a combination of the delta reference QP and the predicted reference QP. Video encoder 20 may then determine a delta QP based on a difference between the reference QP and the actual QP.

According to other aspects, this disclosure includes techniques for predicting a QP for coding a current block using more than one reference QP (e.g., from more than one reference block). That is, video encoder 20 may determine a delta QP for a current block using a predicted QP that is based on more than one reference QP, e.g., from more than one reference picture. According to some aspects of this disclosure, video encoder 20 may determine a weighted QP prediction value using the multiple reference QPs.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan.

After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may select a context model to apply to a certain context to encode symbols to be transmitted. The context may relate to, for example, whether neighboring values are non-zero or not. Video encoder 20 may also entropy encode syntax elements, such as a significant coefficient flag and a last coefficient flag produced when performing an adaptive scan. In accordance with the techniques of this disclosure, video encoder 20 may select the context model used to encode these syntax elements based on, for example, an intra-prediction direction, a scan position of the coefficient corresponding to the syntax elements, block type, and/or transform type, among other factors used for context model selection.

In general, the video decoding process performed by video decoder 30 may include reciprocal techniques to the encoding techniques performed by video encoder 20. Although generally reciprocal, video decoder 30 may, in some instances, perform techniques similar to those performed by video encoder 20. Video decoder 30 may also rely on syntax elements or other data contained in a received bitstream that includes the data described with respect to video encoder 20.

In particular, according to aspects of this disclosure, video decoder 30 may perform techniques similar to, or the same as the techniques described above with respect to video encoder 20 to determine QPs when decoding video data. That is, video decoder 30 may implement the techniques of this disclosure for reducing an amount of data that is stored for reference QPs. For example, rather than storing reference QPs for each block of each reference picture (e.g., a picture used for predicting other pictures), video decoder 30 may only store a portion of such reference QP data. That is, rather than storing a reference QP for each block of each reference picture (for generating predictive pixel data), video decoder 30 may average QPs, sub-sample QPs, or otherwise reduce the amount of such reference QP data, as described in greater detail below. Video decoder may generate an actual QP (e.g., for inverse quantizing a block of video data) based on a combination of a received delta QP and the stored reference QP data.

According to other aspects, video decoder 30 may limit the amount of reference QP data that is stored by predicting a reference QP and storing reference QPs relative to the predicted reference QP. For example, video decoder 30 may predict a reference QP for an area of a picture, and video decoder 30 may store only the differences between the predicted reference QP and actual reference QPs, which may be referred to as delta reference QPs. When generating an actual QP for inverse quantizing a block of video data, video decoder 30 may initially determine a reference QP based on a stored delta reference QP. That is, video decoder 30 may reconstruct the reference QP based on a combination of the delta reference QP and the predicted reference QP. Video decoder 30 may then determine the actual QP for inverse quantizing the block based on a combination of a received delta QP (received in an encoded bitstream) and the reference QP.

According to other aspects, video decoder 30 may predict a QP for coding a current block using more than one reference QP (e.g., from more than one reference block). That is, video decoder 30 may determine a delta QP for a current block using a predicted QP that is based on more than one reference QP, e.g., from more than one reference picture. According to some aspects of this disclosure, video decoder 30 may determine a weighted QP prediction value using the multiple reference QPs.

In some examples, video encoder 20 may generate and video decoder 30 may receive certain parameter sets, which may be used when decoding video data. For example, in the H.264/AVC (Advanced Video Coding) standard, coded video segments are organized into NAL units, which provide a "network-friendly" video representation addressing applications such as video telephony, storage, broadcast, or streaming. NAL units can be categorized to Video Coding Layer (VCL) NAL units and non-VCL NAL units. VCL units may contain the core compression engine and may include block, macroblock, and/or slice level data. Other NAL units may be non-VCL NAL units. In some examples, a coded picture in one time instance, normally presented as a primary coded picture, may be contained in an access unit, which may include one or more NAL units.

Non-VCL NAL units may include parameter set NAL units and SEI NAL units, among others. Parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence or picture, hence coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as SEI NAL units.

Supplemental Enhancement Information (SEI) may contain information that is not necessary for decoding the coded pictures samples from VCL NAL units, but may assist in processes related to decoding, display, error resilience, and other purposes. SEI messages may be contained in non-VCL NAL units. SEI messages are the normative part of some standard specifications, and thus are not always mandatory for standard compliant decoder implementation. SEI messages may be sequence level SEI messages or picture level SEI messages.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

Figure 2:
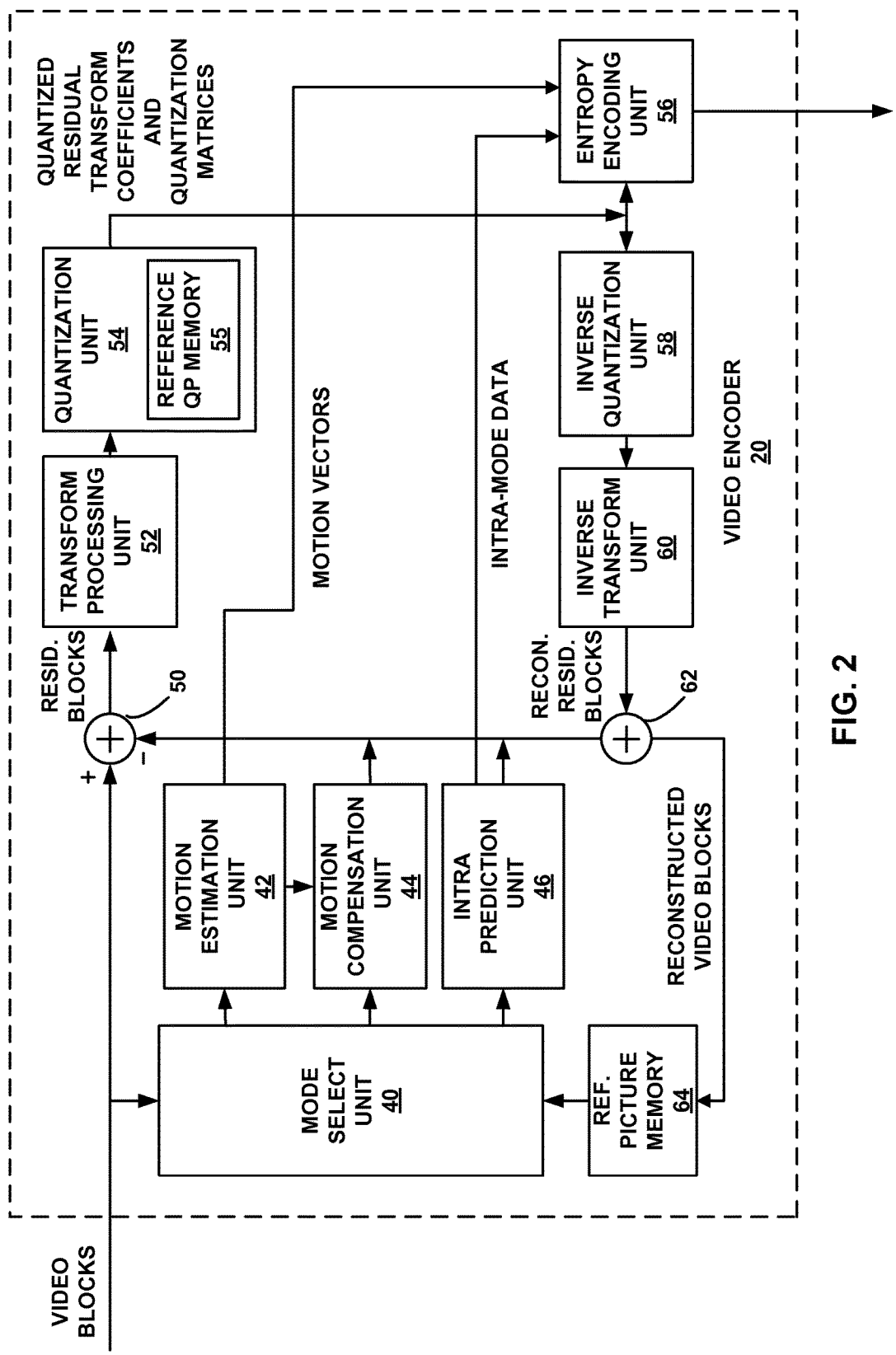
FIG. 2 is a block diagram illustrating an example of a video encoder that may implement any or all of the techniques of this disclosure.

FIG. 2 is a block diagram illustrating an example of video encoder 20 that may implement techniques for controlling an amount of quantization that is applied to one or more transform coefficients during video coding. It should be understood that certain components of FIG. 2 may be shown and described with respect to a single component for conceptual purposes, but may include one or more functional units. In addition, while certain components of FIG. 2 may be shown and described with respect to a single component, such components may be physically comprised of one or more than one discrete and/or integrated units.

As shown in FIG. 2, video encoder 20 receives a current video block within a video frame to be encoded. In the example of FIG. 2, video encoder 20 includes mode select unit 40, motion estimation unit 42, motion compensation unit 44, intra-prediction unit 46, reference frame memory 64, summer 50, transform processing unit 52, quantization unit 54 having reference QP memory 55, and entropy encoding unit 56. For video block reconstruction, video encoder 20 also includes inverse quantization unit 58, inverse transform unit 60, and summer 62.

Video encoder 20 generally illustrates the components that encode video blocks within a video slice to be encoded. The slice may be divided into multiple video blocks (and possibly into sets of video blocks referred to as tiles). Mode select unit 40 may select one of a plurality of possible coding modes, such as one of a plurality of intra coding modes or one of a plurality of inter coding modes as described below, for the current video block based on error results (e.g., coding rate and the level of distortion). Mode select unit 40 may provide the resulting intra- or inter-coded block to summer 50 to generate residual block data and to summer 62 to reconstruct the encoded block for use as a reference picture.

Motion estimation unit 42 and motion compensation unit 44 perform inter-predictive coding of the received video block relative to one or more blocks in one or more reference pictures. Motion estimation unit 42 and motion compensation unit 44 may be highly integrated, but are illustrated separately for conceptual purposes.

In general, motion estimation, as performed by motion estimation unit 42, is the process of generating motion vectors, which estimate motion for video blocks. A motion vector, for example, may indicate the displacement of a predictive block within a predictive reference picture (or other coded unit) relative to the current block being coded within the current picture (or other coded unit). A predictive block is a block that is found to closely match the block to be coded, in terms of pixel difference, which may be determined by sum of absolute difference (SAD), sum of square difference (SSD), or other difference metrics. Predictive blocks may also be referred to as "reference blocks," as the predictive blocks are referred to during inter-prediction.

Accordingly, motion estimation unit 42 may calculate a motion vector for a video block of an inter-coded picture by comparing a block currently being coded to reference blocks of a reference picture in reference picture memory 64. The ITU-T H.264 standard refers to "lists" of reference pictures, e.g., list 0 and list 1. List 0 includes reference pictures having a display order earlier than the current picture, while List 1 includes reference pictures having a display order later than the current picture. In other coding schemes, a single list may be maintained. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction unit 46 may calculate ratios from the distortions and rates for the various encoded blocks to determine which intra-prediction mode exhibits the best rate-distortion value for the block.

In any case, after selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Transform processing unit 52 applies a transform, such as a discrete cosine transform (DCT), integer transform, or a conceptually similar transform, to the residual block, producing a video block comprising residual transform coefficient values. Transform processing unit 52 may perform other transforms, such as those defined by the H.264 standard, which are conceptually similar to DCT. Wavelet transforms, integer transforms, sub-band transforms or other types of transforms could also be used. In any case, transform processing unit 52 applies the transform to the residual block, producing a block of residual transform coefficients. Transform processing unit 52 may convert the residual information from a pixel value domain to a transform domain, such as a frequency domain.

Quantization unit 54 quantizes the residual transform coefficients to further reduce bit rate. The quantization process may reduce the bit depth associated with some or all of the coefficients. The degree of quantization may be modified by adjusting a quantization parameter. For example, quantization generally involves mapping values within a relatively large range to values in a relatively small range, thus reducing the amount of data needed to represent the quantized transform coefficients. The video encoder may quantize the transform coefficients by applying a quantization parameter (QP) according to a predefined algorithm. The video encoder may modify the degree of quantization applied to the transform coefficient values by adjusting the QP. In some examples, the video encoder may select a QP in a range of 0 to 51, although other QP ranges may be used (e.g., −26 to 26, or other range).

In an example, quantization unit 54 may carry out quantization according to equation (1) shown below:

$$Z_{ij} = \text{round}(Y_{ij}/Q_{step}) \qquad (1)$$

where $Y_{ij}$ is a level (i.e., value) of a transform coefficient (described above), $Q_{step}$ is a quantizer step size, and $Z_{ij}$ is a level of a quantized coefficient. In some examples, a total of 52 values of $Q_{step}$ may be supported and indexed according to a quantization parameter (QP).

Quantization unit 54 may vary the QP from one block to another within a slice (or a picture). Varying the QP between blocks or slices, sometimes referred to as adaptive quantization, targets visual quality improvement. That is, human eyes are generally more sensitive to degradation within visually "flat" areas (e.g., areas of a slice or picture without much luminance or color variation) than degradation within visually "busy" areas. Accordingly, adaptive quantization attempts to exploit these visual limitations by performing finer quantization on flat areas and coarser quantization on busy areas.

To reduce the amount of data that is signaled in the bitstream, quantization unit 54 may predict a QP for a given block. For example, rather than include the QP itself, quantization unit 54 may identify a change (i.e., a delta) between the actual QP for a current block and some reference QP (e.g., a QP associated with a different block). Quantization unit 54 may then signal the delta QP for the current block in the bitstream, i.e., for use by decoder 30. In some examples, reference QP data may be stored in reference QP memory 55, although QP data may also be stored in another location, such as reference picture memory 64 or another memory associated with video encoder 20

When generating a delta QP, quantization unit 54 may identify a reference QP that is associated with a block that spatially neighbors the current block (e.g., a neighboring block in the same slice or picture). For example, an H.264 compliant encoder may signal a delta QP at macroblock level, using a neighboring macroblock's QP as a reference QP for a current macroblock. The inherently consistent macroblock size and raster scanning order may naturally preserve the spatial correlation that exists between the QPs of neighboring macroblocks.

However, as noted above, the proposed HEVC standard introduces the concept of a CU, which may vary in size. The variable size and scanning order of CUs may break the spatial correlation that is prevalent in H.264. In such instances, a reference QP of a different temporal instance than the current QP may provide a more accurate predictor than a spatially neighboring QP. Accordingly, in some examples, quantization unit 54 may identify a reference QP that is associated with a block from a different temporal instance than the current block when determining a delta QP. That is, quantization unit 54 may identify a QP associated with a previously encoded block of a previously encoded picture as a reference QP for a QP of a current block of a current picture. In examples in which the current block is inter-predicted, the reference QP may be associated with the reference block identified by motion vector information. Quantization unit 54 may then generate a delta QP for the current block using the reference QP.

In order to efficiently predict a QP of a current block using a reference QP in a different temporal instance, however, quantization unit 54 must store, e.g., in reference QP memory 55, a number of reference QPs. For example, quantization unit 54 may store reference QPs for each block of each reference picture that may be identified when encoding a current block (e.g., identified by motion estimation unit 42 during inter-coding). Significant storage space in reference QP memory 55 may be required to store such QPs. For example, the proposed HEVC standard allows up to 16 reference pictures to be used, and QPs may be generated and stored for each 8×8 block within each reference picture. As an example, a 1920×1080 pixel reference picture (e.g., for 1080p video) may contain as many as 32,400 blocks (8×8 blocks), each of which may have an associated reference QP. Moreover, according to the HEVC standard, QPs may vary between 0-51 (e.g., 8 bits per QP). Thus, storing reference QP data for each reference picture may consume a significant amount of storage.

Quantization unit 54 may apply certain techniques of this disclosure to reduce an amount of data that is stored when predicting QPs, for example, for generating delta QPs. That is, according to aspects of this disclosure, rather than storing reference QPs for each block of each reference picture (e.g., a picture used for predicting other pictures), quantization unit 54 may only store a portion of such reference QP data. For example, in the example described above, rather than storing a reference QP for each 8×8 block of each reference picture, quantization unit 54 may only store a portion of such reference QP data. In some examples, quantization unit 54 may average QPs, sub-sample QPs, or otherwise reduce the amount of reference QP data prior to storing the reference QP data.

In an example for purposes of illustration, quantization unit 54 may generate an average reference QP using QPs of more than one block. For example, quantization unit 54 may average reference QPs within a predefined area. That is, quantization unit 54 may average reference QPs associated with blocks located in a 16×16 area, a 32×32 area, a 64×64 area, or the like. The averaging areas may generally align with block boundaries. That is, an averaging area may generally encompass one or more full sized blocks (or CUs). According to some examples, the number of QPs averaged by quantization unit 54 may be determined according to a minimum CU size that is used for coding (e.g., a smaller CU size may lead to a relatively smaller averaging area). In other examples, the number of QPs averaged by quantization unit 54 may be determined according to a desired amount of storage savings (e.g., with greater storage savings achieved by a relatively larger averaging area).

Quantization unit 54 may apply a variety of averaging algorithms to QPs in an averaging area in order to produce an average reference QP. In an example, quantization unit 54 may generate an average reference QP using equation (2) below:

$$\left[ \frac{\sum_{k=0}^{N-1} QP_k + \frac{N}{2}}{N} \right] \quad (2)$$

where N is equal to the number of QPs being averaged and $QP_k$ represents each of the QPs being averaged.

In another example, to reduce an amount of reference QP data that is stored, quantization unit 54 may sub-sample reference QPs from a particular area. For example, quantization unit 54 may identify an area that includes a number of blocks having a number of associated QPs (which may be used as reference QPs during coding). Instead of averaging over the area, as described in the example above, quantization unit 54 may select one of the reference QPs as a representative QP of the area. In some examples, as described above with respect to the averaging example, quantization unit 54 may select a 16×16, 32×32, 64×64, or other area that is generally consistent with CU boundaries.

Video encoder 20 may signal the averaging area and/or sub-sampling selection criteria, for example, in an encoded bitstream for use by a video decoder, such as video decoder 30. For example, video encoder 20 may include an indication of the averaging area in header information (e.g., a slice header) or a parameter set (e.g., a picture parameter set (PPS) or a sequence parameter set (SPS)) of an encoded bitstream. In another example, video encoder 20 may include an indication of which block to sub-sample when determining a reference QP in a header, parameter set, or the like.

According to other aspects, quantization unit 54 may limit the amount of reference QP data that is stored by determining a difference (e.g., delta) reference QP and storing the delta reference QP instead of a reference QP for one or more reference blocks. For example, quantization unit 54 may generate a delta reference QP value by calculating a difference between an actual reference QP and some other QP. In some examples, the other QP may be a predicted reference QP. For example, quantization unit 54 may predict a reference QP for an area of a picture, and quantization unit 54 may only store the differences between the actual reference QPs and the predicted reference QP.

In an example for purposes of illustration, quantization unit 54 may determine a delta reference QP for a reference block by calculating the difference between a QP of the reference block (e.g., being stored as reference QP) and a QP for the slice ("slice QP") to which the reference block belongs. For example, according to the proposed HEVC standard, quantization unit 54 may determine a QP value (or delta QP value) for each slice of video data. In such an example, quantization unit 54 may generate a delta reference QP for each reference block in a slice by calculating the difference value between the reference block's QP and the slice QP (or delta QP). In other examples, quantization unit 54 may predict a QP for purposes of determining a delta reference QP. For example, quantization unit 54 may predict a QP for determining a delta reference QP by generating a mean QP, a median QP, a minimum QP, a maximum QP, or the like for a predetermined area (e.g., a predetermined area of a slice, an entire slice, an entire picture). Quantization unit 54 may use the predicted QP for purposes of determining and storing a delta reference QP.

In some examples, to further reduce the amount of reference QP data that is stores, quantization unit 54 may truncate (e.g., round or clip) the number of bits associated with the determined delta reference QPs prior to storing the delta reference QPs. For example, quantization unit 54 may reduce the delta reference QPs to a smaller bit depth prior to storing the delta reference QPs.

According to other aspects, quantization unit 54 may predict a QP for coding a current block using more than one reference QP (e.g., from more than one reference block). That is, quantization unit 54 may determine a delta QP for a current block using a predicted QP that is based on more than one reference QP, e.g., from more than one reference picture. In an example, for a bi-directionally predicted picture (e.g., a B-frame), quantization unit 54 may identify a reference QP in a previous picture (e.g., a previous temporal instance) and a reference QP in a future picture (e.g., a temporal instance occurring later in time than the current picture). Quantization unit 54 may then generate a QP predictor by averaging the two reference QPs. Quantization unit 54 may use the QP predictor, as noted above, when generating a delta QP for a current block. That is, quantization unit 54 may generate a delta QP for a current block by calculating a difference between the actual current QP and the QP predictor (which was generated using the two reference QPs).

Following quantization, entropy encoding unit 56 entropy codes the quantized transform coefficients. For example, entropy encoding unit 56 may perform content adaptive variable length coding (CAVLC), context adaptive binary arithmetic coding (CABAC), or another entropy coding technique. Following the entropy coding by entropy encoding unit 56, the encoded video may be transmitted to another device or archived for later transmission or retrieval. In the case of context adaptive binary arithmetic coding (CABAC), context may be based on neighboring macroblocks.

In some cases, entropy encoding unit 56 or another unit of video encoder 20 may be configured to perform other coding functions, in addition to entropy coding. For example, entropy encoding unit 56 may be configured to determine the CBP values for the macroblocks and partitions. Also, in some cases, entropy encoding unit 56 may perform run length coding of the coefficients in a macroblock or partition thereof. In particular, entropy encoding unit 56 may apply a zig-zag scan or other scan pattern to scan the transform coefficients in a macroblock or partition and encode runs of zeros for further compression. Entropy encoding unit 56 also may construct header information with appropriate syntax elements for transmission in the encoded video bitstream.

Inverse quantization unit 58 and inverse transform processing unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the pictures of reference picture memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference picture memory 64. The reconstructed video block may be used by motion estimation unit 42 and motion compensation unit 44 as a reference block to inter-code a block in a subsequent video picture.

Figure 3:
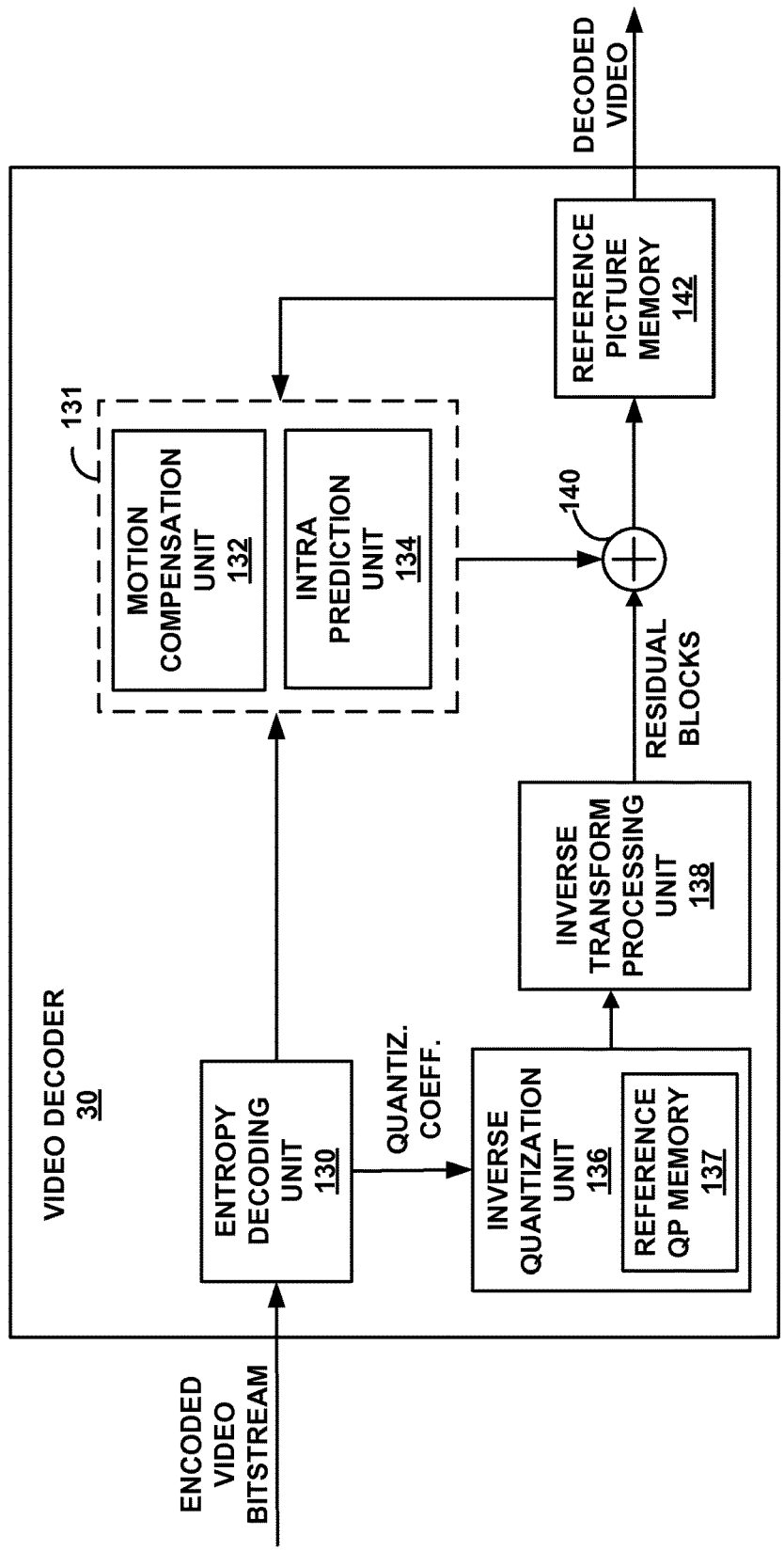
FIG. 3 is a block diagram illustrating an example of a video decoder, which decodes an encoded video sequence.

FIG. 3 is a block diagram illustrating an example of video decoder 30, which decodes an encoded video sequence. In the example of FIG. 3, video decoder 30 includes an entropy decoding unit 130, a prediction unit 131 having a motion compensation unit 132 and intra prediction unit 134, an inverse quantization unit 136 having reference QP memory 137, an inverse transformation unit 138, a reference picture memory 142 and summer 140.

During the decoding process, video decoder 30 receives an encoded video bitstream that represents video blocks of an encoded video slice and associated syntax elements from video encoder 20. Entropy decoding unit 130 of video decoder 30 entropy decodes the bitstream to generate quantized coefficients, motion vectors, and other syntax elements. Entropy decoding unit 130 forwards the motion vectors and other syntax elements to prediction unit 131. Video decoder 30 may receive the syntax elements at the video slice level and/or the video block level.

When the video slice is coded as an intra-coded (I) slice, intra prediction unit 134 of prediction unit 131 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 132 of prediction unit 131 produces predictive blocks for a video block of the current video slice based on the motion vectors and other syntax elements received from entropy decoding unit 130. The predictive blocks may be produced from one of the reference pictures within one of the reference picture lists. Video decoder 30 may construct the reference frame lists, List 0 and List 1, using default construction techniques based on reference pictures stored in reference picture memory 142.

Motion compensation unit 132 determines prediction information for a video block of the current video slice by parsing the motion vectors and other syntax elements, and uses the prediction information to produce the predictive blocks for the current video block being decoded. For example, motion compensation unit 132 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 132 may also perform interpolation based on interpolation filters. Motion compensation unit 132 may use interpolation filters as used by video encoder 20 during encoding of the video blocks to calculate interpolated values for sub-integer pixels of reference blocks. In this case, motion compensation unit 132 may determine the interpolation filters used by video encoder 20 from the received syntax elements and use the interpolation filters to produce predictive blocks. Intra prediction unit 134 may use intra prediction modes received in the bitstream to form a prediction block from spatially adjacent blocks.

Inverse quantization unit 136 inverse quantizes, i.e., de-quantizes, the quantized block coefficients provided in the bitstream and decoded by entropy decoding unit 130. According to some aspects of this disclosure, inverse quantization unit 136 may be configured to operate in a manner generally reciprocal to that of quantization unit 54 described above with respect to the video encoder 20 shown in the example of FIG. 2. For example, inverse quantization unit 136 may receive a delta QP signaled by a video encoder, such as video encoder 20. The delta QP may be a difference between an actual QP for inverse quantizing and one or more reference QPs stored in reference QP memory 137. Accordingly, inverse quantization unit 136 may identify one or more reference QPs and generate the actual QP based on the delta QP and the one or more reference QPs. That is, where quantization unit 54 described with respect to FIG. 2 generated a delta QP based on a difference between an actual QP and one or more reference QPs, inverse quantization unit 136 may generate an actual QP for inverse quantizing a block based on a combination of a received delta QP and one or more reference QPs. While described as being stored in reference QP memory 137, it should be understood that, in some examples, reference QPs may be stored with other reference data in reference picture memory 142, or in other memory associated with video decoder 30.

Inverse quantization unit 136 may apply certain techniques of this disclosure to reduce an amount of data that is stored when predicting QPs, for example, for generating delta QPs. That is, according to aspects of this disclosure, rather than storing reference QPs for each block of each reference picture (e.g., a picture used for predicting other pictures), inverse quantization unit 136 may only store a portion of such reference QP data. For example, in the example described above, rather than storing a reference QP for each 8×8 block of each reference picture, inverse quantization unit 136 may only store a portion of such reference QP data. In some examples, inverse quantization unit 136 may average QPs, sub-sample QPs, or otherwise reduce the amount of reference QP data prior to storing the reference QP data.

For example, as described above with respect to video encoder 20, inverse quantization unit 136 may generate an average reference QP using QPs of more than one block (e.g., within a predefined area). In another example, to reduce an amount of reference QP data that is stored, inverse quantization unit 136 may sub-sample reference QPs from a particular area. For example, rather than averaging QPs in a predetermined area, inverse quantization unit 136 may select one of the reference QPs as a representative QP of the area.

Video decoder 30 may determine the averaging area and/or sub-sampling selection criteria, for example, according to one or more syntax elements received in the encoded bitstream. For example, video decoder 30 may decode an indication of the averaging area in header information (e.g., a slice header) or a parameter set (e.g., a picture parameter set (PPS) or a sequence parameter set (SPS)) from an encoded bitstream. In another example, video decoder 30 may decode an indication of which block to sub-sample when determining a reference QP in a header, parameter set, or the like. In other examples, video decoder 30 may be configured to perform the same processes for storing reference QP data as video encoder 20. Accordingly, in some examples, the averaging area and/or sub-sampling selection criteria may not be signaled.

According to other aspects, inverse quantization unit 136 may limit the amount of reference QP data that is stored by determining a difference (e.g., delta) reference QP and storing the delta reference QP instead of a reference QP for one or more reference blocks. For example, inverse quantization unit 136 may generate a delta reference QP value by calculating a difference between an actual reference QP and some other QP. In some examples, the other QP may be a predicted reference QP. For example, inverse quantization unit 136 may predict a reference QP for an area of a picture, and inverse quantization unit 136 may only store the differences between the actual reference QPs and the predicted reference QP.

In an example, inverse quantization unit 136 may determine a delta reference QP for a reference block by calculating the difference between a QP of the reference block (e.g., being stored as reference QP) and a QP for the slice ("slice QP") to which the reference block belongs. In other examples, inverse quantization unit 136 may predict a QP for purposes of determining a delta reference QP. For example, inverse quantization unit 136 may predict a QP for determining a delta reference QP by generating a mean QP, a median QP, a minimum QP, a maximum QP, or the like for a predetermined area (e.g., a predetermined area of a slice, an entire slice, an entire picture). Inverse quantization unit 136 may use the predicted QP for purposes of determining and storing a delta reference QP. In some examples, to further reduce the amount of reference QP data that is stored, inverse quantization unit 136 may truncate (e.g., round or clip) the number of bits associated with the determined delta reference QPs prior to storing the delta reference QPs.

According to other aspects, inverse quantization unit 136 may predict a QP for coding a current block using more than one reference QP (e.g., from more than one reference block). That is, inverse quantization unit 136 may determine a delta QP for a current block using a predicted QP that is based on more than one reference QP, e.g., from more than one reference picture. In an example, for a bi-directionally predicted picture (e.g., a B-frame), inverse quantization unit 136 may identify a reference QP in a previous picture and a reference QP in a future picture. Inverse quantization unit 136 may then generate a QP predictor by averaging or otherwise combining the two reference QPs. Inverse quantization unit 136 may use the QP predictor, as noted above, when generating a delta QP for a current block. That is, inverse quantization unit 136 may generate a delta QP for a current block by calculating a difference between the actual current QP and the QP predictor (which was generated using the two reference QPs).

Inverse transform processing unit 138 applies an inverse transform, e.g., an inverse DCT, an inverse integer transform, or a conceptually similar inverse transform process, to the transform coefficients in order to produce residual blocks in the pixel domain. Motion compensation unit 132 produces motion compensated blocks, possibly performing interpolation based on interpolation filters. Identifiers for interpolation filters to be used for motion estimation with sub-pixel precision may be included in the syntax elements. Motion compensation unit 132 may use interpolation filters as used by video encoder 20 during encoding of the video block to calculate interpolated values for sub-integer pixels of a reference block. Motion compensation unit 132 may determine the interpolation filters used by video encoder 20 according to received syntax information and use the interpolation filters to produce predictive blocks.

Motion compensation unit 132 uses some of the syntax information to determine sizes of macroblocks used to encode picture(s) of the encoded video sequence, partition information that describes how each macroblock of a picture of the encoded video sequence is partitioned, modes indicating how each partition is encoded, one or more reference pictures (or lists) for each inter-encoded macroblock or partition, and other information to decode the encoded video sequence.

Summer 140 sums the residual blocks with the corresponding prediction blocks generated by motion compensation unit 132 or intra-prediction unit to form decoded blocks. If desired, a deblocking filter may also be applied to filter the decoded blocks in order to remove blockiness artifacts. The decoded video blocks are then stored in reference picture memory 142, which provides reference blocks for subsequent motion compensation and also produces decoded video for presentation on a display device (such as display device 32 of FIG. 1).

Figure 4A:
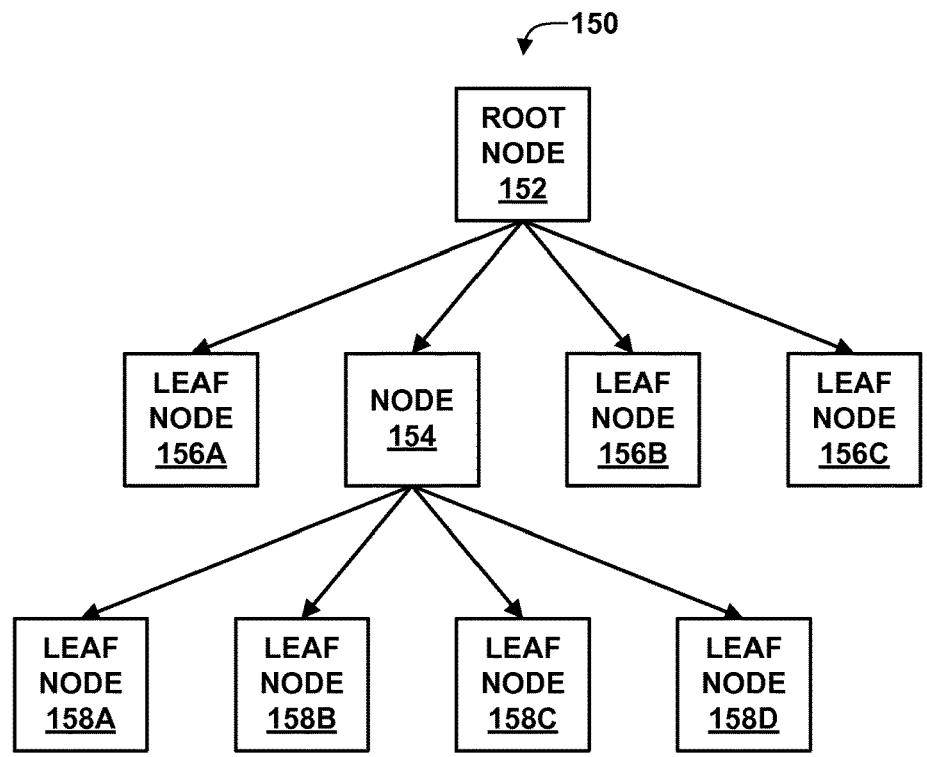
FIGS. 4A and 4B are conceptual diagrams illustrating an example quadtree and a corresponding largest coding unit (LCU).
Figure 4B:
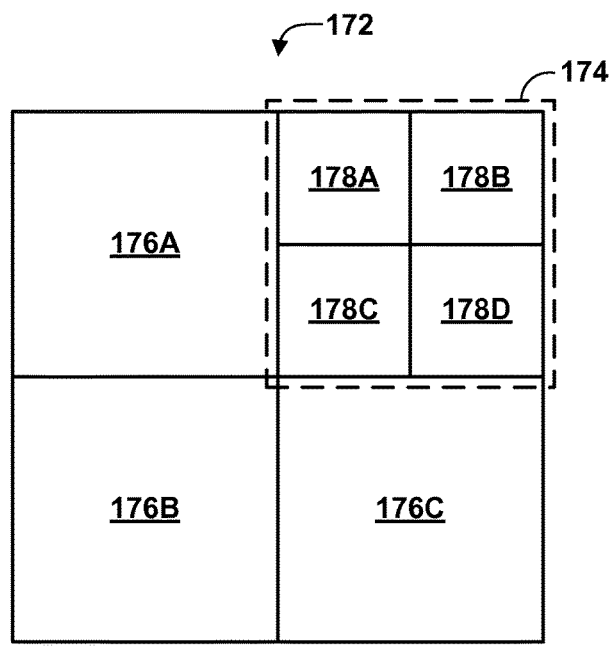

FIGS. 4A and 4B are conceptual diagrams illustrating an example quadtree 150 and a corresponding largest coding unit 172. FIG. 4A depicts an example quadtree 150, which includes nodes arranged in a hierarchical fashion. The quadtree 150 may be associated with, for example, a treeblock according to the proposed HEVC standard. Each node in a quadtree, such as quadtree 150, may be a leaf node with no children, or have four child nodes. In the example of FIG. 4A, quadtree 150 includes root node 152. Root node 152 has four child nodes, including leaf nodes 156A-156C (leaf nodes 156) and node 154. Because node 154 is not a leaf node, node 154 includes four child nodes, which in this example, are leaf nodes 158A-158D (leaf nodes 158).

Quadtree 150 may include data describing characteristics of a corresponding largest coding unit (LCU), such as LCU 172 in this example. For example, quadtree 150, by its structure, may describe splitting of the LCU into sub-CUs. Assume that LCU 172 has a size of 2N×2N. LCU 172, in this example, has four sub-CUs 176A-176C (sub-CUs 176) and 174, each of size N×N. Sub-CU 174 is further split into four sub-CUs 178A-178D (sub-CUs 178), each of size N/2×N/2. The structure of quadtree 150 corresponds to the splitting of LCU 172, in this example. That is, root node 152 corresponds to LCU 172, leaf nodes 156 correspond to sub-CUs 176, node 154 corresponds to sub-CU 174, and leaf nodes 158 correspond to sub-CUs 178.

Data for nodes of quadtree 150 may describe whether the CU corresponding to the node is split. If the CU is split, four additional nodes may be present in quadtree 150. In some examples, a node of a quadtree may be implemented similar to the following pseudocode:

```
quadtree_node {
    boolean split_flag(1);
    // signaling data
    if (split_flag) {
        quadtree_node child1;
        quadtree_node child2;
        quadtree_node child3;
        quadtree_node child4;
    }
}
```

The split_flag value may be a one-bit value representative of whether the CU corresponding to the current node is split. If the CU is not split, the split_flag value may be '0', while if the CU is split, the split_flag value may be '1'. With respect to the example of quadtree 150, an array of split flag values may be 101000000.

In some examples, each of sub-CUs 176 and sub-CUs 178 may be intra-prediction encoded using the same intra-prediction mode. Accordingly, video encoder 20 may provide an indication of the intra-prediction mode in root node 152.

While FIG. 4A illustrates an example of a CU quadtree, it should be understood that a similar quadtree may be applied to TUs of a leaf-node CU. That is, a leaf-node CU may include a TU quadtree that describes partitioning of TUs for the CU. A TU quadtree may generally resemble a CU quadtree, except that the TU quadtree may signal intra-prediction modes for TUs of the CU individually.

In any case, because CUs and TUs for a given treeblock may vary in size, as in the example shown in FIGS. 4A and 4B, the spatial correlation that is prevalent in other coding standards (e.g., such as H.264) may be lost. Accordingly, a spatial neighbor may not provide the best reference QP for a block currently being coded. In such instances, the video coder may identify a reference QP (predictive QP) in a different temporal instance than a QP of a block currently being coded. The video coder may implement the techniques of this disclosure to reduce the amount of data that is stored when predicting QPs. For example, the video coder may implement the techniques described above with respect to FIGS. 2 and 3 to efficiently store reference QP data from one or more reference pictures.

While the techniques of FIGS. 5-9 are generally described as being performed by a video coder, it should be understood that, in some examples, the techniques of FIGS. 5-9 may be carried out by video encoder 20 (FIGS. 1 and 2) or video decoder 30 (FIGS. 1 and 3), described above. In other examples, the techniques of FIGS. 5-9 may be performed by a variety of other processors, processing units, hardware-based coding units such as encoder/decoders (CODECs), and the like.

Figure 5:
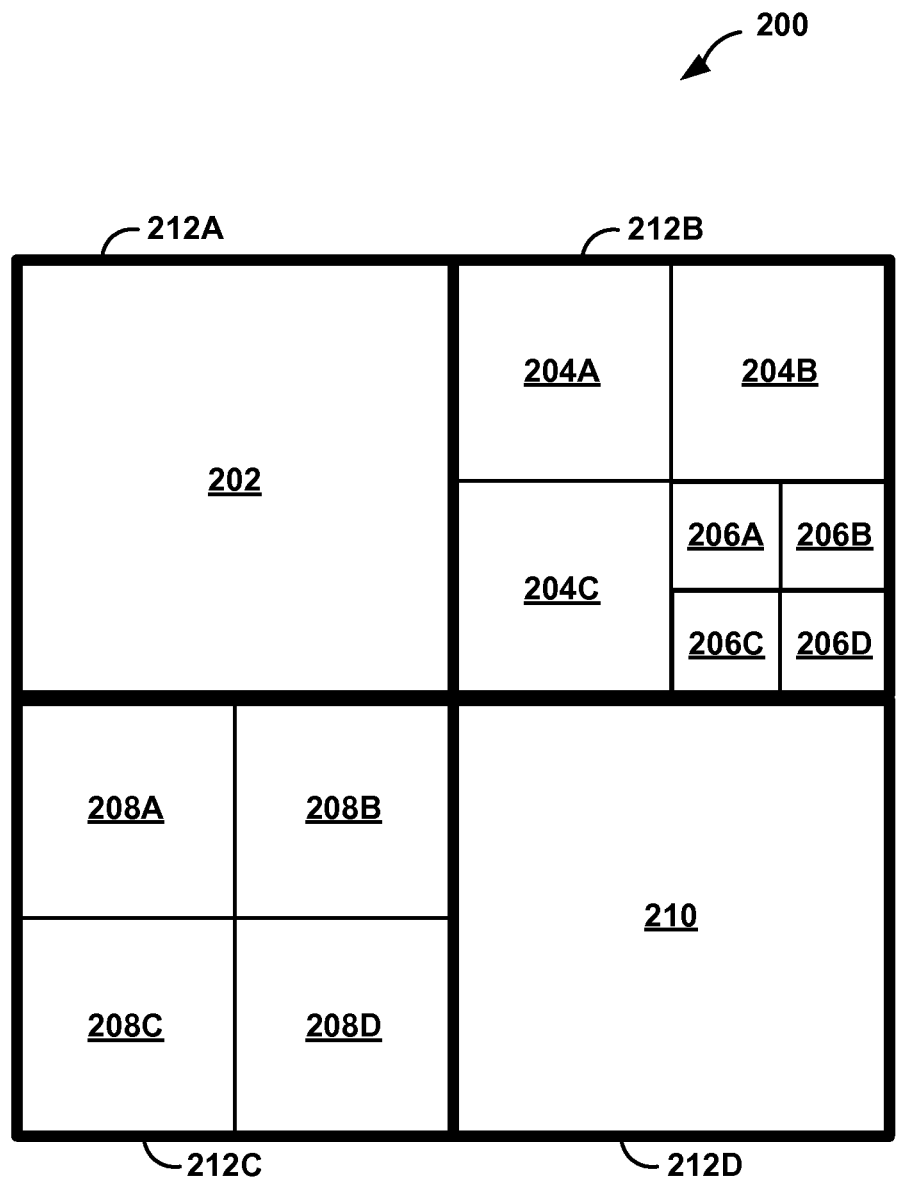
FIG. 5 is a conceptual diagram that illustrates reducing an amount of reference QP data that is stored by a video coding device.

FIG. 5 is a conceptual diagram that illustrates reducing an amount of reference QP data that is stored by a video coding device (e.g., video encoder 20 and/or video decoder 30). The example shown in FIG. 5 includes a portion of a picture or a slice of video data containing a plurality of blocks of video data 200. In an example for purposes of illustration, blocks 200 may include four LCUs that are 32×32 pixels in size. That is, blocks 200 may include, from left to right and top to bottom, a first undivided LCU 202 (32×32 pixels), a second LCU having sub-CUs 204A, 204B, and 204C (collectively, sub-CUs 204, each 16×16 pixels) and sub-CUs 206A, 206B, 206C, and 206D (collectively, sub-CUs 206, each 8×8 pixels), a third LCU having sub-CUs 208A, 208B, 208C, and 208D (collectively, sub-CUs 208, each 32×32 pixels, each 16×16 pixels), and a fourth undivided LCU 210

(32×32 pixels). It should be understood that the arrangement and sizes of blocks 200 are provided for purposes of example only, and the techniques described below may be applied to blocks of other arrangements and/or sizes.

Blocks 200 may be included in a reference picture used inter-prediction of one or more other blocks. Accordingly, assume that each of blocks 200 includes a reference QP that may be used to predict a QP of another block. According to aspects of this disclosure, rather than storing QPs for all of blocks 200, a video coder (such as video encoder 20 and/or video decoder 30) may limit the amount of QP data that is stored by storing only a portion of the QP data.

For example, according to some aspects, the video coder may generate a combined reference QP for a predetermined number of blocks 200 to represent the predetermined number of blocks. In an example, the video coder may average reference QPs of blocks 200 within a predefined area of the picture to generate the reference QP for the blocks. The averaging area may include blocks located in a 16×16 area, a 32×32 area, a 64×64 area, or the like.

In the example shown in FIG. 5, the video coder generates a representative reference QP for each of four 32×32 areas by combining QPs from reference blocks in each area. For example, the video coder may generate an average reference QP for each of a first averaging area 212A, a second averaging area 212B, a third averaging area 212C, and a fourth averaging area 212D (collectively, averaging areas 212). In the example shown in FIG. 5, the first averaging area 212A includes the first undivided LCU 202 and the fourth averaging area 212D includes the fourth undivided LCU 210. Accordingly, each of those averaging areas includes a single reference QP (i.e., no averaging necessary). That is, area 212A has a first reference QP, and area 212D has a second reference QP, which may be the same as or different the first reference QP, depending on the actual QP for the areas. However, the video coder may generate a representative reference QP for the second averaging area 212B by averaging the reference QPs associated with sub-CUs 204 and sub-CUs 206. In addition, the video coder may generate a representative reference QP for the third averaging area 212C by averaging the reference QPs associated with sub-CUs 208. By generating a representative reference QP for each of the averaging areas 212 the video coder may reduce the amount of reference QP data that is stored (e.g., relative to storing reference QPs for each of the blocks 200).

The video coder may implement a variety of averaging algorithms to determine a representative reference QP for averaging areas 212. In an example, the video coder may determine an average reference QP for each of the averaging areas 212 using equation (2) described above. In addition, while reference is generally made to "averaging," it should be understood that the video coder may combine reference QPs within the averaging areas 212 in other ways. That is, in other examples, the video coder may determine representative reference QPs for each of the averaging areas 212 by determining a median value, a range, a mode, or the like. In any case, after determining a combined, representative reference QP for each of averaging areas 212, the video coder may store the representative reference QPs.

In the case in which the video coder is a video encoder (such as video encoder 20), the video encoder may use the stored representative reference QPs when generating a delta QP. For example, when encoding a current block of video data that is inter-predicted from any of blocks 200, the video encoder may use the appropriate representative reference QP for determining a delta QP for coding the current block. That is, if the current block is predicted from sub-CU 206A, rather than using the QP associated with sub-CU 206A to generate a delta QP, the video encoder generate the delta QP based on a difference between the actual QP and the average reference QP for area 212B. After determining the delta QP, i.e., representing the difference between the actual QP for the block and the reference QP for the area, the video encoder may include the delta QP in an encoded bitstream.

In examples in which the video coder is a video decoder (such as video decoder 30), the video decoder may use the stored representative reference QPs when determining an actual QP for inverse quantizing a current block. For example, when decoding a current block of video data that is inter-predicted from any of blocks 200, the video decoder may use the appropriate representative reference QP for determining an actual QP from a received delta QP. That is, if the current block is predicted from sub-CU 206A, rather than using the QP associated with sub-CU 206A to generate the actual QP, the video decoder generate the actual QP based on a combination of the received delta QP and the average reference QP for area 212B. After determining the actual QP, the video decoder may inverse quantize the current block.

The averaging areas 212 may generally align with block boundaries such that each averaging area encompasses one or more full blocks of blocks 200. In some examples, the size of averaging areas 212 may be selected according to a minimum block size. That is, for a portion of a picture having relatively small CUs, the video coder may use a relatively smaller averaging area. In other examples, the size of the averaging areas 212 may be selected based on a desired amount of storage savings (e.g., a larger area for relatively greater storage savings).

According to other aspects, the video coder may reduce the amount of reference QP data that is stored by sub-sample reference QPs from each of the averaging areas 212. For example, the video coder may determine a representative reference QP for each of the averaging areas by sub-sampling each of the averaging areas 212. That is, rather than combining all of the reference QPs of an averaging area, as described above, the video coder may determine a reference QP for each of the averaging areas 212 by selecting one of the reference QPs as a representative reference QP.

In an example, the video coder may determine a reference QP for averaging area 212B by selecting the reference QP associated with the block in the upper left corner of averaging area 212B. In this example, the video coder may use the reference QP associated with sub-CU 204A as the reference QP for all of the blocks of averaging area 212. In other examples, the video coder may select a different block when sub-sampling.

In any case, as noted above, the video coder may store the sub-sampled representative QP for each of averaging areas 212. Accordingly, when coding a current block of video data that is inter-predicted from any of blocks 200, the video coder may use the appropriate representative QP. for determining a delta QP for coding the current block. That is, the example used above, if the current block is predicted from sub-CU 206A, rather than using the reference QP associated with sub-CU 206A to generate a delta QP, the video coder may use the sub-sampled reference QP for area 212B (e.g., such as the reference QP associated with sub-CU 204A). After determining the delta QP, the video coder may determine the actual QP and code the block using the actual QP.

According to other aspects, the video coder may reduce the amount of reference QP data that is stored by determining and storing a difference (e.g., delta) reference QP for each of the blocks 200. For example, the video coder may initially predict a reference QP for a predetermined area that includes one or more of blocks 200. The predicted QP may act as a reference QP for the reference QPs. That is, the video coder may determine a delta reference QP for each of blocks 200 by determining a difference between the actual QPs for each of blocks 200 and the predicted value. The video coder may store the delta reference QPs for blocks 200. Accordingly, the delta reference QPs for blocks 200 may be available when coding blocks 200.

In the case in which the video coder is a video encoder (such as video encoder 20), the video encoder may use the stored delta reference QPs when generating a delta QP. For example, if a block currently being encoded block is predicted from sub-CU 206A, rather than using the QP associated with sub-CU 206A to generate a delta QP, the video encoder may initially reconstruct the QP from sub-CU 206A using the stored delta reference QP associated with sub-CU 206A. That is, the video encoder may combine the delta reference QP associated with sub-CU 206A with the predicted QP for blocks including sub-CU 206A. The video encoder may then generate the delta QP based on a difference between the actual QP for quantizing the block and the reconstructed QP associated with sub-CU 206A. After determining the delta QP, the video encoder may include the delta QP in an encoded bitstream.

In examples in which the video coder is a video decoder (such as video decoder 30), the video decoder may use the stored delta reference QPs when determining an actual QP for inverse quantizing a current block. For example, if the block currently being decoded is predicted from sub-CU 206A, rather than using the QP associated with sub-CU 206A to generate the actual QP, the video decoder may initially reconstruct the QP from sub-CU 206A using the stored delta reference QP associated with sub-CU 206A. That is, like the video encoder described above, the video decoder may combine the delta reference QP associated with sub-CU 206A with the predicted QP for blocks including sub-CU 206A. The video decoder may then generate the actual QP based on a combination of the received delta QP and the reconstructed QP from sub-CU 206A. After determining the actual QP, the video decoder may inverse quantize the current block. In some examples, a video coder may use a slice QP as a predicted QP (e.g., the slice QP for the slice to which the blocks 200 belong). That is, the video coder may determine and store the difference between the slice QP and the actual QP for each of the blocks 200 as delta reference QPs for blocks 200. In other examples, the video coder may predict the QP for blocks 200 by determining a mean QP for the blocks 200, a median QP for the blocks 200, a minimum QP for the blocks, a maximum QP for the blocks 200, or the like. The video coder may then determine and store delta reference QPs for blocks 200 using the predicted QP for blocks 200.

In some examples, to further reduce the amount of reference QP data that is store, the video coder may truncate (e.g., round or clip) the number of bits associated with the determined delta reference QPs prior to storing the delta reference QPs. For example, the video coder may reduce the delta reference QPs to a smaller bit depth prior to storing the delta reference QPs.

According to some aspects of the disclosure, the video coder may generate delta reference QPs and truncate the delta reference QPs before storing the truncated delta reference QPs. In an example, the video coder may perform the following steps when generating clipped delta reference QPs for blocks 200:

1. Determine a predicted value for one or more blocks 200 (e.g., one or more CUs, PUs, LCUs, set of LCUs) of a reference picture. The predicted value may be a QP associated with the slice or picture to which the one or more blocks 200 belong, or another QP (e.g., a mean QP, a median QP, a minimum QP, a maximum QP, or the like).
2. Determine a difference between the QP of the one or more blocks and the predicted QP (delta reference QP=actual QP−predicted QP).
3. Reduce the space required to store the delta reference QP by truncating (e.g., rounding, clipping, quantizing, or the like) the delta reference QP to a predefined bit range. Example algorithms for clipping the delta reference QP may include:
    Clipped Delta Reference QP=Clip3($-2^{(N-2)}$, $2^{(N-2)-1}$, Delta QP)
    Clipped Delta Reference QP=Clip3(0, $2^{(N-1)-1}$, Delta QP)
    Clipped Delta Reference QP=Clip3($-2^{(N-2)}$, $2^{(N-2)-1}$, Quant(Delta QP))
    Clipped Delta Reference QP=Clip3(0, $2^{(N-1)-1}$, Quant(Delta QP))
  where the clipped delta reference QP is within the range of Clip3(min, max, a) and N is the desired bit range. According to some examples, Quant(a) may be any quantization scheme. One example of quantization can be Quant(A)=A/M.
4. Store the truncated delta reference QP.

In examples in which a delta reference QP is determined for each of the blocks 200, the video coder may repeat the process described above for each block 200. In examples in which a delta reference QP is determined for more than one block, the video coder may repeat the process described above for each predetermined group of blocks 200. That is, in some examples, as described above, the video coder may determine a representative QP for more than one of the blocks 200 (e.g., for each of the averaging areas 212). In such examples, the video coder may repeat the process described above to generate a delta reference QP for each representative QP.

Figure 6:
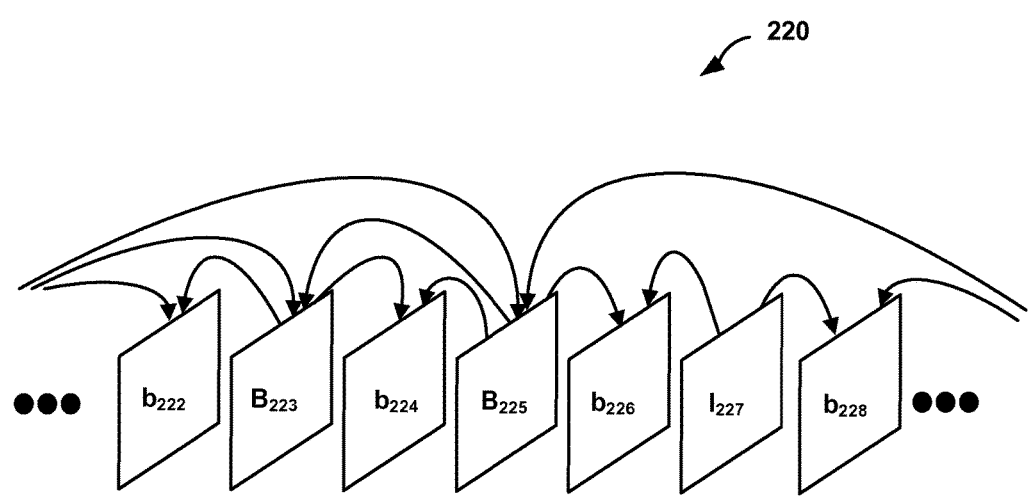
FIG. 6 is a conceptual diagram illustrating a portion of a group of pictures (GOP).

FIG. 6 is a conceptual diagram illustrating a partial group of pictures (GOP) 200. The portion of GOP 220 shown in FIG. 5 includes pictures with a picture order count (POC) from 222-228 including six bi-directionally predicted pictures and one intra-predicted picture. For example, the pictures labeled with a lower case "b" (i.e., pictures 222, 224, 226 and 228) are pictures that are bi-directionally inter predicted from two other pictures, as shown by the arrows. The pointed-to pictures use the pointed-from pictures as predictors in an inter prediction coding process. The pictures with the lower case "b" are not used to predict other pictures. The pictures labeled with the upper case "B" (i.e., pictures 223 and 225) are also pictures that are bi-directionally inter predicted from two other pictures.

In contrast with the "b" pictures, the pictures labeled with the upper case "B" are used as predictors for other pictures, as shown by the arrows. Picture $I_{227}$ is an in intra-predicted picture. That is, picture $I_{227}$ is not encoded with reference to other pictures, but rather, uses internal spatial prediction to code the picture. However, picture $I_{207}$ may be used to predict other pictures (e.g., picture $b_{226}$ and $b_{228}$ as shown in the example of FIG. 5).

Pictures that are used as predictors for other pictures may be referred to as reference pictures and may be stored in a reference picture memory of a video coder (e.g., such as video encoder 20 and/or video decoder 30). That is, in the example shown in FIG. 6, B-frames $B_{223}$ and $B_{225}$ and I-frame $I_{227}$ may be stored by a video coder (e.g., video encoder 20 and/or video decoder 30) in a reference picture memory, thereby allowing the pictures to be accessed for purposes of inter-prediction. In addition, as noted above with respect to FIGS. 2 and 3, in some examples, the video coder may store a variety of other data associated with the reference pictures, such as reference QPs. For example, each block of a reference picture may have an associated reference QP, i.e., the QP used to quantize (or inverse-quantize) the block.

Storing reference QPs may allow the video coder to identify a reference QP that is associated with a block from a different temporal instance than a current block when determining a delta QP. That is, in the example shown in FIG. 6, the video coder may be currently coding a block of picture $b_{226}$. In this example, when determining a delta QP for the current block, the video coder may identify a reference QP that is associated with a block from either picture $B_{225}$ or $I_{227}$. For example, the video coder may use the reference QP associated with either reference block identified by motion vector information associated with the current block. The video coder may then generate a delta QP for the current block using the reference QP.

According to aspects of this disclosure, the video coder may identify more than one reference QP when generating a delta QP for the block currently being coded. In some examples, the reference QPs may be from more than one reference picture. The reference QPs may be combined to form a single reference QP, which may be referred to as a QP predictor for the QP of the current block. The video coder may then generate a delta QP for the current block by determining a difference between the actual QP for the current block and the QP predictor.

In the example described above, when determining a QP predictor for a block of picture $b_{226}$, the video coder may identify a reference QP that is associated with a block from picture $B_{225}$, as well as a reference QP that is associated with a block from picture $I_{227}$. The video coder may then generate a QP predictor by combining the two reference QPs. In some examples the video coder may combine the two reference QPs by averaging the two reference QPs. In other examples, the video coder may combine the two reference QPs in another manner. For example, the video coder may determine a weighted QP predictor. That is, the video coder may apply a weight to each reference QP that is used to generate the QP predictor. In an example, a video coder may generate a weighted QP predictor according to equation (3) below:

$$QP_{Pred} = w_0 \times QP_0 + w_1 \times QP_1 \quad (3)$$

where $QP_{Pred}$ is the QP predictor value and $QP_0$, $QP_1$ are the offset corrected QPs from list 0 and list 1 prediction blocks. The weights $w_0$, and $w_1$ may be based on the normalized weights of a weighted prediction tool used in motion compensation. In some examples, QP offset correction may be based on a slice level QP difference between a reference slice and the current slice being coded.

Figure 7:
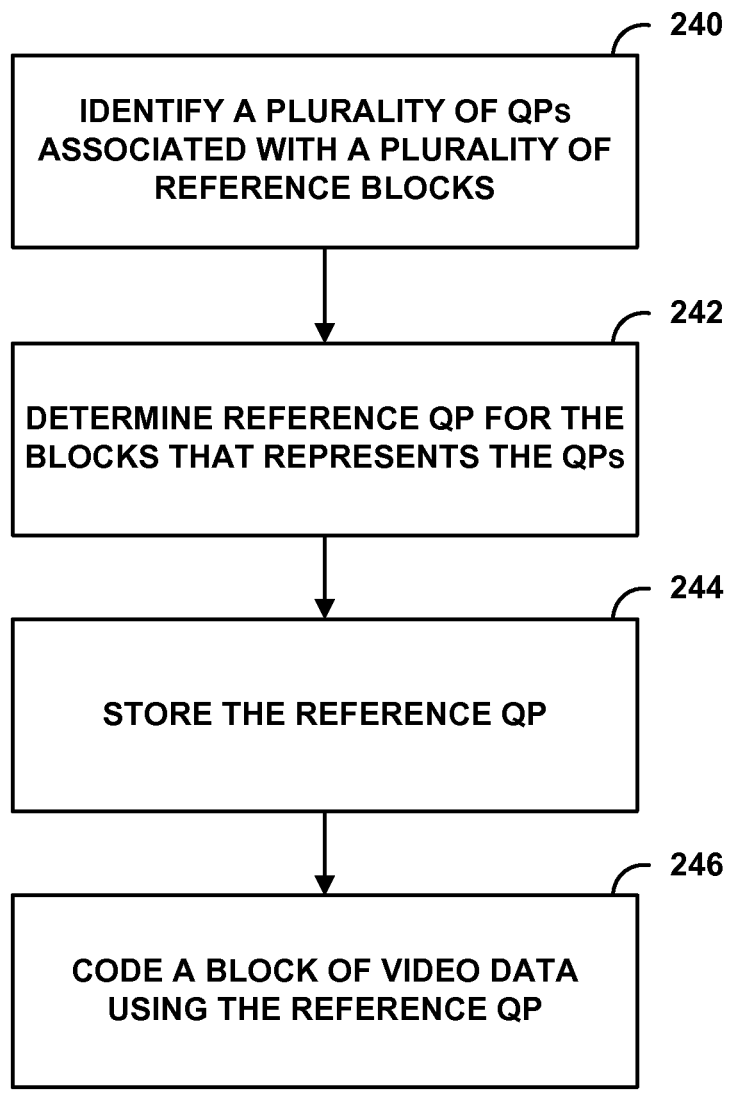
FIG. 7 is a flow diagram illustrating an example technique for reducing an amount of reference QP data that is stored by a video coding device

FIG. 7 is a flow diagram illustrating techniques for reducing an amount of reference QP data that is stored by a video coding device (video coder). In the example of FIG. 7, a video coder may identify a plurality of QPs that are associated with a plurality of reference blocks of video data (240). For example, the plurality of QPs may be associated with reference blocks of video data stored in a reference picture memory used to inter-predict video data, such as reference picture memory 64 (FIG. 2) or reference picture memory 142 (FIG. 3). In some examples, the plurality of QPs may be stored in a reference QP memory, such as reference QP memory 55 (FIG. 2) or reference QP memory 137 (FIG. 3).

The video coder may then determine a reference QP for the plurality of blocks that represents the plurality of QPs (242). For example, as described above with respect to FIG. 5, the video coder may generate a combined reference QP for the plurality of blocks, such as an average reference QP. In other examples, the video coder may determine a minimum QP, a maximum QP, a median QP, a mode QP, a weighted average QP, or the like for the plurality of blocks. In still other examples, the video coder may sub-sample a QP from the plurality of blocks to determine a reference QP that represents the blocks.

The video coder may then store the reference QP (244). For example, the video coder may store the reference QP in a QP reference memory, such as reference QP memory 55 (FIG. 2) or reference QP memory 137 (FIG. 3). In some examples, the video coder may replace the QPs associated with the plurality of reference blocks with the representative QP. In this way, the video coder may reduce the amount of reference QP data that is stored.

According to some aspects, the video coder may then code video data using the stored reference QP data (246). For example, with respect to a video encoder (such as video encoder 20), the video encoder may receive transform coefficients associated with the block. The video encoder may then determine a QP for quantizing the transform coefficients and quantize the transform coefficients using the determined QP. Rather than signaling the actual QP used to quantize the transform coefficients, the video encoder may determine a delta QP between the actual QP and the stored reference QP. The video encoder may then determine and signal a delta QP value for a block based on a difference between the reference QP and the actual QP used to quantize the transform coefficients.

With respect to a video decoder (such as video decoder 30), the video decoder may receive and entropy decode quantized transform coefficients associated with a block of video data. The video decoder may also receive a delta QP for the block. The video decoder may determine the actual QP for inverse quantizing the block based on a combination of the received delta QP and the stored reference QP. The video decoder may then inverse quantize the quantized transform coefficients using the determined actual QP.

The steps of the example shown in FIG. 7 need not necessarily be performed in the order shown in FIG. 7, and fewer, additional, or alternative steps may be performed.

Figure 8:
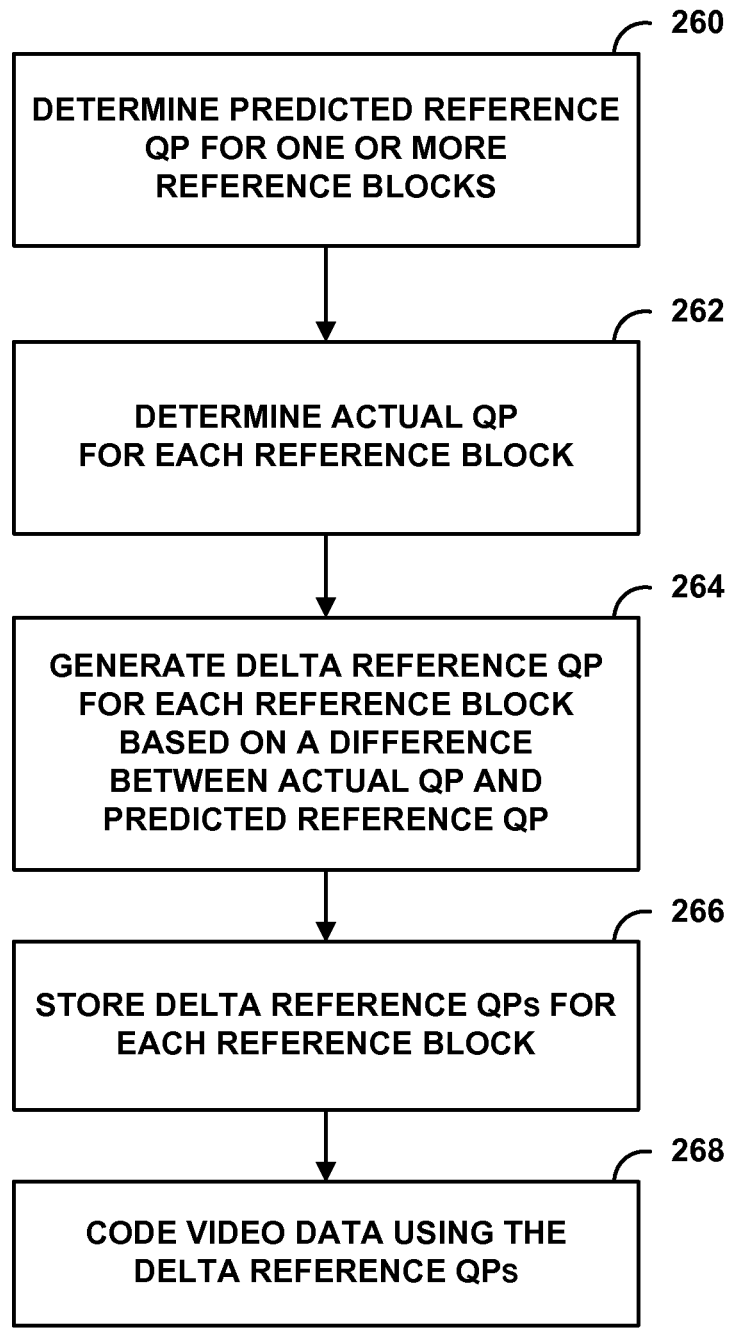
FIG. 8 is a flow diagram illustrating another example technique for reducing an amount of reference QP data that is stored by a video coding device

FIG. 8 is a flow diagram illustrating techniques for reducing an amount of reference QP data that is stored by a video coder (e.g., video encoder 20 and/or video decoder 30). In the example shown in FIG. 8, the video coder determines a predicted reference QP for one or more reference blocks of video data (260). For example, the reference blocks of video data may be stored in a reference picture memory used to inter-predict video data, such as reference picture memory 64 (FIG. 2) or reference picture memory 142 (FIG. 3). In some examples, as described with respect to FIG. 5 above, the video coder may predict a reference QP for the reference blocks based on a slice QP of the slice to which the reference blocks belong. In other examples, the video coder may predict the reference QP using an average QP, a weighted average QP, a minimum QP, a maximum QP, a median QP, a mode QP, or the like for the reference blocks.

The video coder may also determine an actual QP for each reference block of the one or more reference blocks (262). That is, the video coder may determine the QP used to quantize (or inverse quantize) the transform coefficients of the reference blocks. The video coder may then generate a delta reference QP for each reference block based on a difference between the actual QPs and the predicted reference QP (264). For example, the video coder may subtract the predicted reference QP from the actual QP for each reference block to generate a delta reference QP for each block. In some examples, the video coder may also reduce the bit depth of the delta reference QPs after generating the delta reference QPs. For example, the video coder may round, clip, or quantize the delta reference QPs.

The video coder may then store the delta reference QPs for each reference block (266). For example, the video coder may store the delta reference QPs in a QP reference memory, such as reference QP memory 55 (FIG. 2) or reference QP memory 137 (FIG. 3). In some examples, the video coder may replace the QPs associated with the plurality of reference blocks with the delta reference QPs. The delta reference QPs may require fewer bits to store than the actual QPs of the reference blocks. In a simple example for purposes of illustration, assume that three reference blocks have QPs of 3, 4, and 5, and the predicted QP for the three reference blocks is 4. According to some aspects of this disclosure, the delta reference QPs may be −1, 0, and 1. In this example, the delta reference QPs require fewer bits to store than the actual QPs. In this way, the video coder may reduce the amount of reference QP data that is stored.

According to some aspects, the video coder may then code video data using the stored reference QP data (268). For example, with respect to a video encoder (such as video encoder 20), the video encoder may receive transform coefficients associated with a block of video data. The video encoder may then determine a QP for quantizing the transform coefficients and quantize the transform coefficients using the determined QP. Rather than signaling the actual QP used to quantize the transform coefficients, the video encoder may determine a delta QP between the actual QP and a reference QP, which may be determined using the stored delta reference QP. For example, the video encoder may add the stored delta reference QP to the predicted QP to generate the reference QP. The video encoder may then determine and signal a delta QP value based on a difference between the reference QP and the actual QP used to quantize the transform coefficients.

With respect to a video decoder (such as video decoder 30), the video decoder may receive and entropy decode quantized transform coefficients associated with a block. The video decoder may also receive a delta QP for the block (as signaled in an encoded bitstream). The video decoder may determine the actual QP for inverse quantizing the block based on a combination of the received delta QP and at least one of the stored delta reference QPs. For example, the video decoder may add a stored delta reference QP to a predicted QP to generate a reference QP. The video decoder may determine the actual QP for inverse quantizing the block by adding the reference QP to the received delta QP. The video decoder may then inverse quantize the quantized transform coefficients using the determined actual QP.

The steps of the example shown in FIG. 8 need not necessarily be performed in the order shown in FIG. 8, and fewer, additional, or alternative steps may be performed. For example, according to some aspects of this disclosure, the techniques described with respect to FIG. 8 may be used in conjunction with the techniques described with respect to FIG. 7. For example, with respect to step 264 of FIG. 8, the video coder may determine delta reference QPs based on a difference between the reference QPs and a representative QP for the reference block.

Figure 9:
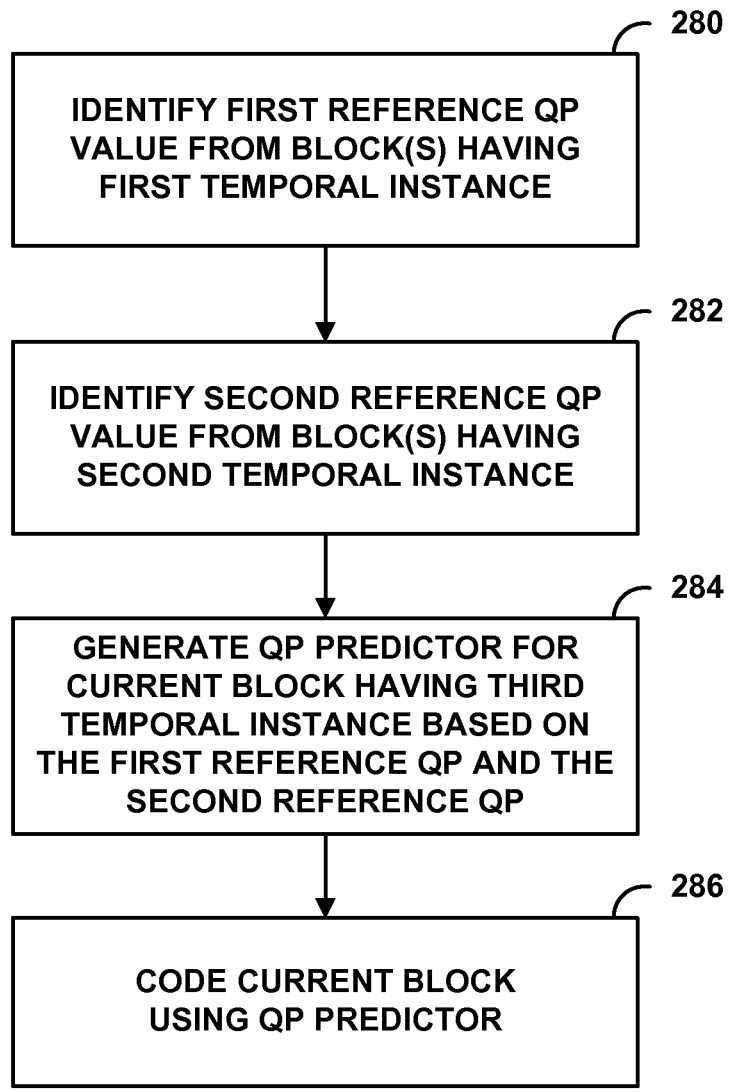
FIG. 9 is a flow diagram illustrating an example technique for determining a determining predicted QP from more than one reference QP.

FIG. 9 is a flow diagram illustrating techniques for generating a QP predictor based on more than one reference QP. In the example shown in FIG. 9, a video coder identifies a first reference QP from one or more reference blocks having a first temporal instance (280). For example, the video coder may identify a reference QP associated with a one or more reference blocks of video data stored in a reference picture memory used to inter-predict video data, such as reference picture memory 64 (FIG. 2) or reference picture memory 142 (FIG. 3). In some examples, the first reference QP may be stored in a reference QP memory, such as reference QP memory 55 (FIG. 2) or reference QP memory 137 (FIG. 3).

The video coder may also identify a second reference QP associated with one or more reference blocks having a second temporal instance that is different than the first temporal instance (282). For example, the video coder may identify a second reference QP associated with one or more other reference blocks stored in a reference picture memory used to inter-predict video data, such as reference picture memory 64 (FIG. 2) or reference picture memory 142 (FIG. 3). In some examples, the second reference QP may also be stored in a reference QP memory, such as reference QP memory 55 (FIG. 2) or reference QP memory 137 (FIG. 3).

In some examples, as described with respect to FIG. 6 above, the first reference QP may be associated it a first reference block of a bi-predicted current block, while the second reference QP may be associated with a second reference block of the bi-predicted block. In such examples, the first reference QP may occur earlier in time than a block currently being coded, while the second reference QP may occur later in time than the block currently being coded.

The video coder may then generate QP predictor for a block currently being coded based on the first reference QP and the second reference QP (284). According to some aspects of this disclosure, the video coder may generate the QP predictor based on an average of the first reference QP and the second reference QP. In some examples, the video coder may generate a weighted average using normalized weights of a weighted prediction tool used in motion compensation. In other examples, the video coder may generate the QP predictor by combining the first reference QP and the second reference QP in any other manner.

The video coder may code the current block using the QP predictor (286). For example, with respect to a video encoder (such as video encoder 20), the video encoder may receive transform coefficients associated with the block. The video encoder may then determine a QP for quantizing the transform coefficients and quantize the transform coefficients using the determined QP. Rather than signaling the actual QP used to quantize the transform coefficients, the video encoder may determine a delta QP between the actual QP and the predicted QP. The video encoder may then determine and signal a delta QP value based on a difference between the QP predictor and the actual QP used to quantize the transform coefficients.

With respect to a video decoder (such as video decoder 30), the video decoder may receive and entropy decode quantized transform coefficients associated with the block. The video decoder may also receive a delta QP the block. The video decoder may determine the actual QP for inverse quantizing the block based on a difference between the received delta QP and the QP predictor. For example, the video decoder may add the delta QP to the QP predictor to determine the actual QP for inverse quantizing the block. The video decoder may then inverse quantize the quantized transform coefficients using the determined actual QP.

The steps of the example shown in FIG. 9 need not necessarily be performed in the order shown in FIG. 9, and fewer, additional, or alternative steps may be performed.

It should be understood that, depending on the example, certain acts or events of any of the methods described herein can be performed in a different sequence, may be added, merged, or left out all together (e.g., not all described acts or events are necessary for the practice of the method). Moreover, in certain examples, acts or events may be performed concurrently, e.g., through multi-threaded processing, interrupt processing, or multiple processors, rather than sequentially. In addition, while certain aspects of this disclosure are described as being performed by a single module or unit (e.g., such as quantization unit 54 (FIG. 2) or inverse quantization unit 136 (FIG. 3)) for purposes of clarity, it should be understood that the techniques of this disclosure may be performed by a combination of units or modules associated with a video coder.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol.

In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium.

It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various aspects of the disclosure have been described. These and other aspects are within the scope of the following claims.

The invention claimed is:

1. A method of coding video data comprising:
identifying a plurality of quantization parameters (QPs) associated with a plurality of reference blocks of video data;
generating a reference QP for the plurality of reference blocks based on the plurality of QPs;
replacing the plurality of QPs associated with the plurality of reference blocks with the reference QP in memory; and
coding a block of video data based on the reference QP.

2. The method of claim 1, wherein generating the reference QP comprises generating an average QP based on the plurality of QPs.

3. The method of claim 2, wherein generating the average QP comprises calculating an average of the plurality of QPs associated with the plurality of reference blocks.

4. The method of claim 3, wherein generating the average QP comprises generating the average QP based on the equation:

$$\left[ \frac{\sum_{k=0}^{N-1} QP_k + \frac{N}{2}}{N} \right]$$

where N comprises the number of QPs of the plurality of QPs and $QP_k$ comprises each of the number of QPs being averaged.

5. The method of claim 1, wherein generating the reference QP comprises selecting a representative QP from the plurality of QPs associated with the plurality of reference blocks.

6. The method of claim 1, wherein identifying the plurality of QPs associated with the plurality of reference blocks comprises identifying the plurality of reference blocks in a predefined area of a reference picture, wherein the reference picture is associated with a different temporal instance than a picture that contains the block.

7. The method of claim 6, wherein the predefined area comprises one of a 16×16 area, a 32×32 area, and a 64×64 area.

8. The method of claim 1, wherein coding the block comprises encoding the block, and wherein encoding the block further comprises:
   determining an actual QP for quantizing transform coefficients of the block;
   determining a delta QP based on a difference between the actual QP and the reference QP; and
   generating a bitstream to include an indication of the delta QP.

9. The method of claim 1, wherein coding the block comprises decoding the block, and wherein decoding the block further comprises:
   determining an actual QP for inverse quantizing transform coefficients of the block based on a combination of a received delta QP for the block and the reference QP; and
   inverse quantizing the transform coefficients using the determined actual QP.

10. An apparatus for coding video data, the apparatus comprising:
   a memory configured to store a plurality of quantization parameters (QPs) associate with a plurality of reference blocks of video data; and
   one or more processors, the one or more processors configured to:
      identify the plurality of QPs associated with the plurality of reference blocks of video data;
      generate a reference QP for the plurality of reference blocks based on the plurality of QPs;
      replace the plurality of QPs associated with the plurality of reference blocks with the reference QP in the memory; and
      code a block of video data based on the reference QP.

11. The apparatus of claim 10, wherein the one or more processors are configured to generate the reference QP by generating an average QP based on the plurality of QPs.

12. The apparatus of claim 11, wherein the one or more processors are configured to generate the average QP by calculating an average of the plurality of QPs associated with the plurality of reference blocks.

13. The apparatus of claim 12, wherein the one or more processors are configured to generate the average QP by generating the average QP based on the equation:

$$\left[ \frac{\sum_{k=0}^{N-1} QP_k + \frac{N}{2}}{N} \right]$$

where N comprises the number of QPs of the plurality of QPs and $QP_k$ comprises each of the number of QPs being averaged.

14. The apparatus of claim 10, wherein the one or more processors are configured to generate the reference QP by selecting a representative QP from the plurality of QPs associated with the plurality of reference blocks.

15. The apparatus of claim 10, wherein the one or more processors are configured to identify the plurality of QPs associated with the plurality of reference blocks by identifying the plurality of reference blocks in a predefined area of a reference picture, wherein the reference picture is associated with a different temporal instance than a picture that contains the block.

16. The apparatus of claim 10, wherein the apparatus comprises a video encoder, and wherein the one or more processors are further configured to:
   determine an actual QP for quantizing transform coefficients of the block;
   determine a delta QP based on a difference between the actual QP and the reference QP; and
   generate a bitstream to include an indication of the delta QP.

17. The apparatus of claim 10, wherein the apparatus comprises a video decoder, and wherein the one or more processors are further configured to:
   determine an actual QP for inverse quantizing transform coefficients of the block based on a combination of a received delta QP for the block and the reference QP; and
   inverse quantize the transform coefficients using the determined actual QP.

18. An apparatus for coding video data comprising:
   means for identifying a plurality of quantization parameters (QPs) associated with a plurality of reference blocks of video data;
   means for generating a reference QP for the plurality of reference blocks based on the plurality of QPs;
   means for replacing the plurality of QPs associated with the plurality of reference blocks with the reference QP in memory; and
   means for coding a block of video data based on the reference QP.

19. The apparatus of claim 18, wherein the means for generating the reference QP comprises means for generating an average QP based on the plurality of QPs.

20. The apparatus of claim 19, wherein the means for generating the average QP comprises means for calculating an average of the plurality of QPs associated with the plurality of reference blocks.

21. The apparatus of claim 18, wherein the means for generating the reference QP comprises means for selecting a representative QP from the plurality of QPs associated with the plurality of reference blocks.

22. The apparatus of claim 18, wherein the means for identifying the plurality of QPs associated with the plurality of reference blocks comprises means for identifying the plurality of reference blocks in a predefined area of a reference picture, wherein the reference picture is associated with a different temporal instance than a picture that contains the block.

23. A non-transitory computer-readable storage medium having instructions stored thereon that, when executed, cause one or more processors to:
   identify a plurality of quantization parameters (QPs) associated with a plurality of reference blocks of video data;
   generate a reference QP for the plurality of reference blocks based on the plurality of QPs;
   replace the plurality of QPs associated with the plurality of reference blocks with the reference QP; and
   code a block of video data based on the reference QP.

24. The computer-readable storage medium of claim 23, wherein to generate the reference QP, the instructions cause the one or more processors to generate an average QP based on the plurality of QPs.

25. The computer-readable storage medium of claim 24, wherein to generate the average QP comprises, the instructions cause the one or more processors to calculate an average of the plurality of QPs associated with the plurality of reference blocks.

26. The computer-readable storage medium of claim 23, wherein to generate the reference QP, the instructions cause the one or more processors to select a representative QP from the plurality of QPs associated with the plurality of reference blocks.

27. The computer-readable storage medium of claim 23, wherein to identify the plurality of QPs associated with the plurality of reference blocks, the instructions cause the one or more processors to identify the plurality of reference blocks in a predefined area of a reference picture, wherein the reference picture is associated with a different temporal instance than a picture that contains the block.

28. A method of coding video data comprising:
 determining a predicted reference QP for one or more reference blocks of video data, wherein the one or more reference blocks are used as a reference for coding a current block;
 determining an actual QP for each reference block of the one or more reference blocks;
 generating a delta reference QP for each reference block of the one or more reference blocks based on a difference between the actual QP and the predicted reference QP;
 storing the delta reference QPs for each reference block; and
 coding a QP for the current block of video data based on one or more of the stored delta reference QPs.

29. The method of claim 28, further comprising reducing a bit depth associated with the delta reference QPs prior to storing the delta reference QPs.

30. The method of claim 29, wherein reducing the bit depth comprises quantizing the delta reference QPs.

31. The method of claim 28, wherein determining the predicted QP comprises determining a slice QP associated with a slice of video data to which the one or more reference blocks belong.

32. The method of claim 28, further comprising coding the current block based on at least one of the stored delta reference QPs.

33. The method of claim 32, wherein coding the QP for the block comprises encoding the QP for the block, and wherein encoding the QP for the block comprises:
 determining an actual QP for quantizing transform coefficients of the block, wherein the one or more reference blocks are used as a reference for coding a current block;
 reconstructing at least one actual QP for at least one reference block based on the delta reference QP of the at least one reference block and the predicted reference QP;
 determining a delta QP for the block based on a difference between the actual QP for the block and the reconstructed at least one actual QP for the at least one reference block; and
 generating a bitstream to include an indication of the delta QP for the block.

34. The method of claim 32, wherein coding the QP for the block comprises decoding the QP for the block, and wherein decoding the QP for the block comprises:
 obtaining an indication of a delta QP for the block from an encoded bitstream;
 reconstructing at least one actual QP for at least one reference block based on the delta reference QP of the at least one reference block and the predicted reference QP;
 determining the actual QP for inverse quantizing transform coefficients of the block based on a combination of the indicated delta QP for the block and the reconstructed at least one actual QP for the at least one reference block; and
 inverse quantizing the transform coefficients using the determined actual QP for the block.

35. An apparatus for coding video data, the apparatus comprising:
 a memory configured to store a current block of video data and one or more reference blocks for use in coding the current block; and
 one or more processors, wherein the one or more processors are configured to:
  determine a predicted reference QP for the one or more reference blocks of video data;
  determine an actual QP for each reference block of the one or more reference blocks;
  generate a delta reference QP for each reference block of the one or more reference blocks based on a difference between the actual QP and the predicted reference QP;
  store the delta reference QPs for each reference block; and
  code a QP for the current block of video data based on one or more of the stored delta reference QPs.

36. The apparatus of claim 35, wherein the one or more processors are further configured to reduce a bit depth associated with the delta reference QPs prior to storing the delta reference QPs.

37. The apparatus of claim 36, wherein the one or more processors are configured to reduce the bit depth by quantizing the delta reference QPs.

38. The apparatus of claim 35, wherein the one or more processors are configured to determine the predicted QP by determining a slice QP associated with a slice of video data to which the one or more reference blocks belong.

39. The apparatus of claim 35, wherein the one or more processors are further configured to code the current block based on at least one of the stored delta reference QPs.

40. The apparatus of claim 39, wherein the apparatus comprises a video encoder, and wherein the one or more processors are further configured to:
 determine an actual QP for quantizing transform coefficients of the block;
 reconstruct at least one actual QP for at least one reference block based on the delta reference QP of the at least one reference block and the predicted reference QP;
 determine a delta QP for the block based on a difference between the actual QP for the block and the reconstructed at least one actual QP for the at least one reference block; and
 generate a bitstream to include an indication of the delta QP for the block.

41. The apparatus of claim 39, wherein the apparatus comprises a video decoder, and wherein one or more processors are further configured to:
 obtain an indication of a delta QP for the block from an encoded bitstream;
 reconstruct at least one actual QP for at least one reference block based on the delta reference QP of the at least one reference block and the predicted reference QP;

determine the actual QP for inverse quantizing transform coefficients of the block based on a combination of the indicated delta QP for the block and the reconstructed at least one actual QP for the at least one reference block; and inverse quantize the transform coefficients using the determined actual QP for the block.

42. The apparatus of claim 10, wherein the apparatus comprises at least one of:
an integrated circuit;
a microprocessor; or
a wireless communication device.

43. The apparatus of claim 35, wherein the apparatus comprises at least one of:
an integrated circuit;
a microprocessor; or
a wireless communication device.

44. An apparatus for coding video data, the apparatus comprising:
means for determining a predicted reference QP for one or more reference blocks of video data, wherein the one or more reference blocks are used as a reference for coding a current block;
means for determining an actual QP for each reference block of the one or more reference blocks;
means for generating a delta reference QP for each reference block of the one or more reference blocks based on a difference between the actual QP and the predicted reference QP;
means for storing the delta reference QPs for each reference block; and
means for coding a QP for the current block of video data based on one or more of the stored delta reference QPs.

45. The apparatus of claim 44, further comprising means for reducing a bit depth associated with the delta reference QPs prior to storing the delta reference QPs.

46. The apparatus of claim 45, wherein the means for reducing the bit depth comprises means for quantizing the delta reference QPs.

47. The apparatus of claim 44, wherein the means for determining the predicted QP comprises means for determining a slice QP associated with a slice of video data to which the one or more reference blocks belong.

48. The apparatus of claim 44, further comprising means for coding the current block based on at least one of the stored delta reference QPs.

49. A non-transitory computer-readable medium having stored thereon instructions that, when executed, cause one or more processors to:
determine a predicted reference QP for one or more reference blocks of video data, wherein the one or more reference blocks are used as a reference for coding a current block;
determine an actual QP for each reference block of the one or more reference blocks;
generate a delta reference QP for each reference block of the one or more reference blocks based on a difference between the actual QP and the predicted reference QP; and
store the delta reference QPs for each reference block; and
code a QP for the current block of video data based on one or more of the stored delta reference QPs.

50. The computer-readable medium of claim 49, wherein the instructions further cause the one or more processors to reduce a bit depth associated with the delta reference QPs prior to storing the delta reference QPs.

51. The computer-readable medium of claim 50, wherein the instructions cause the one or more processors to reduce the bit depth by quantizing the delta reference QPs.

52. The computer-readable medium of claim 49, wherein the instructions cause the one or more processors to determine the predicted QP by determining a slice QP associated with a slice of video data to which the one or more reference blocks belong.

53. The computer-readable medium of claim 49, wherein the instructions further cause the one or more processors to code the current block based on at least one of the stored delta reference QPs.

* * * * *